(12) United States Patent
Lee

(10) Patent No.: US 12,399,626 B2
(45) Date of Patent: Aug. 26, 2025

(54) RECOVERY METHOD USING FIRST TOKENS, AND STORAGE DEVICE, AND COMPUTING SYSTEM INCLUDING THE SAME

(71) Applicant: Samsung Electronics Co., Ltd., Suwon-si (KR)

(72) Inventor: Jongwon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/234,924

(22) Filed: Aug. 17, 2023

(65) Prior Publication Data

US 2024/0264748 A1 Aug. 8, 2024

(30) Foreign Application Priority Data

Feb. 3, 2023 (KR) .......................... 10-2023-0015035

(51) Int. Cl.
*G06F 12/00* (2006.01)
*G06F 3/06* (2006.01)

(52) U.S. Cl.
CPC .......... *G06F 3/0619* (2013.01); *G06F 3/0659* (2013.01); *G06F 3/0689* (2013.01)

(58) Field of Classification Search
CPC .... G06F 3/0619; G06F 3/0659; G06F 3/0689; G06F 11/1456; G06F 11/1004; G06F 11/1461; G06F 13/28; G06F 11/1458; G06F 9/30029; G06F 11/1076; G06F 11/1469; G06F 13/1668; G06F 13/4022; G06F 13/4221; G06F 21/565

USPC ......................................................... 711/154
See application file for complete search history.

(56) References Cited

U.S. PATENT DOCUMENTS

| | | | |
|---|---|---|---|
| 8,583,984 B2 | 11/2013 | Schmisseur et al. | |
| 8,775,733 B2 | 7/2014 | Kawaguchi | |
| 10,282,252 B2 | 5/2019 | Park | |
| 2012/0059981 A1* | 3/2012 | Flynn | G06F 9/52 711/E12.008 |
| 2019/0235777 A1 | 8/2019 | Wang et al. | |
| 2021/0081273 A1 | 3/2021 | Helmick et al. | |
| 2022/0011979 A1 | 1/2022 | Lim et al. | |
| 2022/0114086 A1 | 4/2022 | Clark et al. | |
| 2023/0223961 A1* | 7/2023 | McCrate | H03M 13/1575 714/746 |
| 2023/0393930 A1* | 12/2023 | Balluchi | G06F 3/0659 |
| 2024/0184783 A1* | 6/2024 | Bert | G06F 16/24552 |

FOREIGN PATENT DOCUMENTS

CA 2800809 A1 * 12/2011 ........... G06F 13/102

OTHER PUBLICATIONS

IEEE Transactions on Cloud Computing, vol. 11, No. 3, Jul. 2023.*

* cited by examiner

*Primary Examiner* — Mardochee Chery
(74) *Attorney, Agent, or Firm* — Muir Patent Law, PLLC

(57) ABSTRACT

A storage device according to an embodiment includes: a first memory that receives and stores a plurality of data packets including first tokens and data chunks corresponding to a plurality of storage devices from the plurality of storage devices; a direct memory access (DMA) engine that performs integrity verification using the first tokens of the plurality of data packets and generates a recovered data chunk using the data chunks of the plurality of data packets; and a second memory that stores the recovered data chunk.

20 Claims, 14 Drawing Sheets

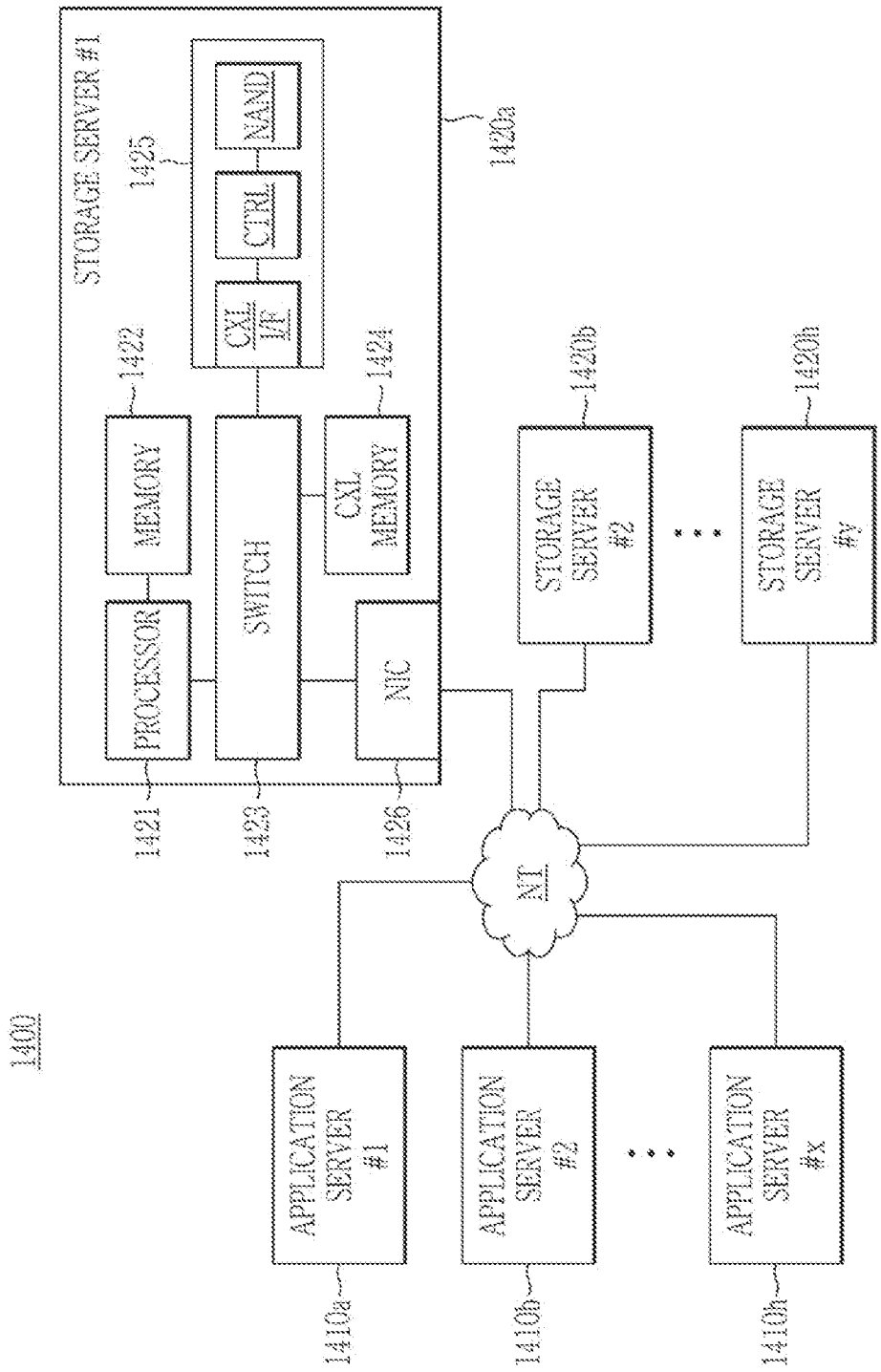

RECOVERY METHOD USING FIRST TOKENS, AND STORAGE DEVICE, AND COMPUTING SYSTEM INCLUDING THE SAME

CROSS-REFERENCE TO RELATED APPLICATION

This application claims priority to and the benefit under 35 U.S.C. § 119 of Korean Patent Application No. 10-2023-0015035, filed on Feb. 3, 2023, in the Korean Intellectual Property Office, the entire contents of which are incorporated herein by reference.

BACKGROUND

(a) Field

The present disclosure relates to a recovery method, a storage device, and a computer system.

(b) Description of the Related Art

Redundant array of inexpensive disk (RAID) is a method mainly used in a computer system such as a server or the like that has important data, and is a method in which parity is stored in one storage device among several storage devices so that even if an error occurs in data stored in another storage device, data having the error may be recovered to normal data. If the RAID is used, an input/output operation may be balanced and overall performance of the server may be improved.

A host of the computer system uses data of another storage device to recover data of a storage device in which an error occurs. In this case, since the host reads data to perform an operation for data recovery, a bottleneck phenomenon occurs in the host, but the storage device is in an idle state. Thus, there is a problem in which a resource is not used efficiently.

SUMMARY

An embodiment is to provide a recovery method, a storage device, and a computer system for efficiently using a resource while alleviating a bottleneck phenomenon.

A storage device according to an embodiment for solving the technical problem includes: a first memory that receives and stores a plurality of data packets including first tokens and data chunks corresponding to a plurality of storage devices from the plurality of storage devices; a direct memory access (DMA) engine that performs integrity verification using the first tokens of the plurality of data packets and generates a recovered data chunk using the data chunks of the plurality of data packets; and a second memory that stores the recovered data chunk.

Each of the first tokens may be generated using a random function.

each of the first tokens may be generated based on an identifier and a logical block address (LBA) of a corresponding storage device of the plurality of storage devices.

The first memory may receive the plurality of data packets through a compute express link (CXL) switch.

When the storage device receives a recovery command from a host, the DMA engine may perform the integrity verification.

The storage device may receive second tokens corresponding to the plurality of storage devices together with the recovery command, the first memory may store the second tokens, and the DMA engine may determine whether the first tokens and the second tokens match.

The DMA engine may determine that the integrity verification is successful if the first tokens and the second tokens match, and may determine that the integrity verification fails if the first tokens and the second tokens do not match.

The DMA engine may re-request an error data packet corresponding to a token for which the integrity verification fails if the integrity verification fails.

The DMA engine may re-request the error data packet by sending a request to the host or to a storage device of the plurality of storage devices corresponding to the error data packet.

One of the data chunks may be a parity data chunk, and the parity data chunk may be generated by performing an exclusive OR (XOR) operation on other data chunks other than the parity data chunk among the data chunks and the data chunk of the storage device.

The DMA engine may generate the recovered data chunk by performing an XOR operation on the data chunks.

The DMA engine may obtain a first reference tag and a first application tag based on the plurality of data packets, may determine whether the first reference tag and the first application tag match a second reference tag and a second application tag stored in the second memory, and may store the recovered data chunk in the second memory when the first reference tag and the first application tag match the second reference tag and the second application tag.

The DMA engine may obtain the first reference tag and the first application tag by performing an XOR operation on the first tokens of the plurality of data packets.

One token of the first tokens may be generated by performing an XOR operation on the remaining tokens of the first tokens, the first reference tag, and the first application tag.

A recovery method performed by a first storage device according to an embodiment may include: receiving data packets from second storage devices that form a redundant array of inexpensive disks (RAID) set with the first storage device; performing integrity verification based on the data packets; and performing recovery using the data packets when the integrity verification is successful.

The recovery method may further include receiving first tokens corresponding to the second storage devices from a host. The data packets may include second tokens, and the performing of the integrity verification may include determining whether the first tokens and the second tokens match.

The determining of whether the first tokens and the second tokens match may include: determining that the integrity verification is successful when the first tokens and the second tokens match; and determining that the integrity verification fails when the first tokens and the second tokens do not match.

The recovery method may further include re-requesting an error data packet corresponding to a token for which the integrity verification fails when the integrity verification fails.

One of the second tokens may be generated based on the remaining tokens of the first tokens, a reference tag, and an application tag.

A computer system according to an embodiment may include: a plurality of storage devices that form a redundant array of inexpensive disks (RAID) set; a compute express link (CXL) switch that allows the plurality of storage devices to communicate with each other; and a host that transmits a read command and first tokens to second storage devices other than a first storage device among the plurality of storage devices through the CXL switch when an error is detected in the first storage device. The host may transmit second tokens to the first storage device and may transmit a recovery command that controls the first storage device to perform integrity verification by comparing the first tokens with the second tokens and performs recovery using data packets of the second storage devices if the integrity verification is successful when the second storage devices generate the data packets based on the first tokens and transmit the data packets to the first storage device through the CXL switch in response to the read command.

BRIEF DESCRIPTION OF THE DRAWINGS

FIG. 14 is a block diagram of a data center to which the computer system according to an example embodiment is applied.

DETAILED DESCRIPTION OF THE EMBODIMENTS

Figure 1:
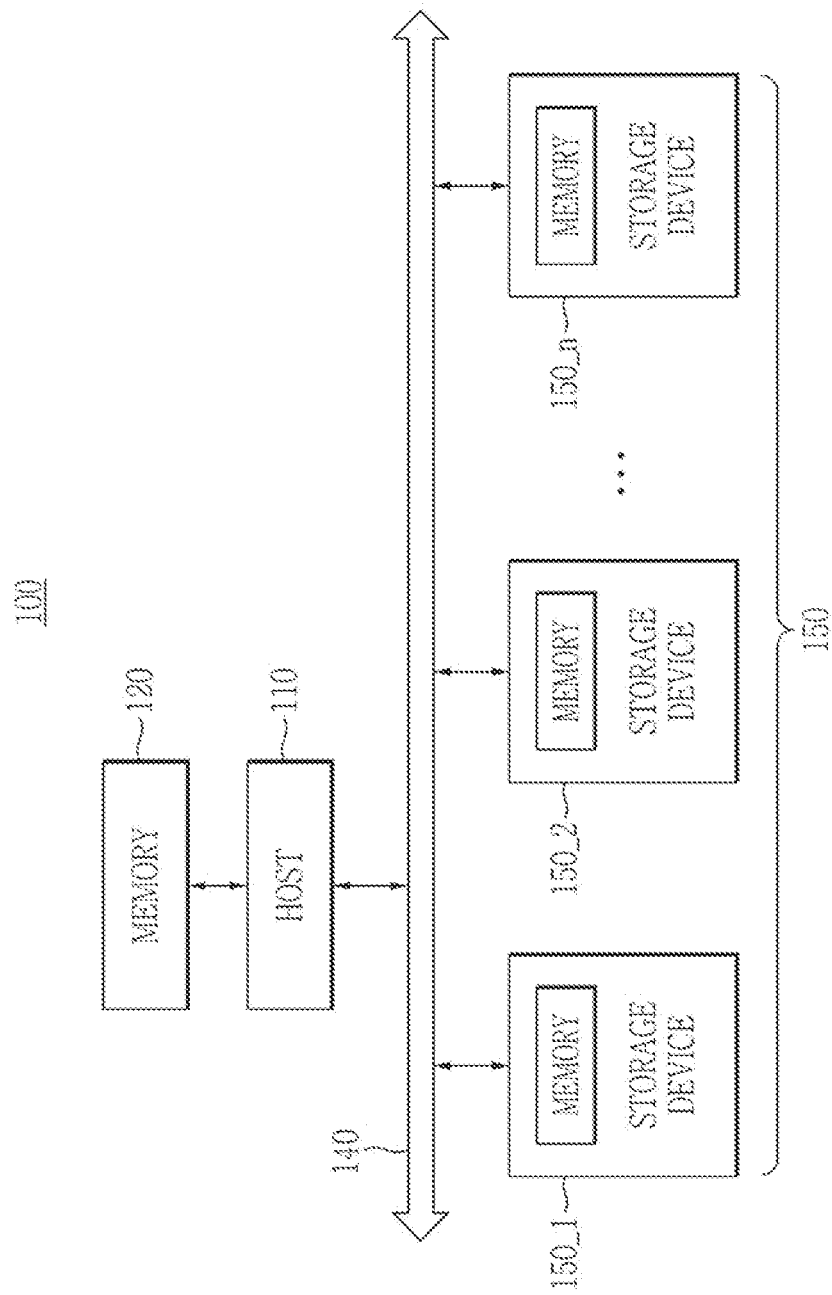
FIG. 1 is a block diagram illustrating a computer system according to an example embodiment.

The present disclosure will be described more fully hereinafter with reference to the accompanying drawings, in which embodiments of the disclosure are shown. As those skilled in the art would realize, the described embodiments may be modified in various different ways, all without departing from the spirit or scope of the present disclosure.

Accordingly, the drawings and description are to be regarded as illustrative in nature and not restrictive. Like reference numerals designate like elements throughout the specification and drawings. In the flowchart described with reference to the drawings, the order of operations may be changed, several operations may be merged, some operations may be divided, and specific operations may not be performed.

In the present specification, expressions described in the singular may be construed in the singular or plural unless an explicit expression such as "one" or "single" is used. In the present specification, the terms including ordinal numbers such as first, second, etc. may be used to describe various elements, but the elements are not limited by the terms. The terms are used only for the purpose of distinguishing one element from another element.

FIG. 1 is a block diagram illustrating a computer system according to an example embodiment.

Referring to FIG. 1, the computer system 100 may include a host 110, a memory 120, and at least one storage device 150. The computer system 100 may be used by a plurality of users, and each user may use the storage devices 150 through the host 110. The storage devices 150 may include first to n-th storage devices 150_1 to 150_n (n is an integer greater than 1). In an embodiment, the computer system 100 may include a user device such as a personal computer (PC), a laptop computer, a server, a media player, a digital camera, or the like, or an automotive device such as a navigation (or a navigation device), a black box, an automotive electronic device, or the like. In addition, the computer system 100 may be a mobile system such as a mobile phone, a smart phone, a tablet personal computer (PC), a wearable device, a health care device, an Internet of Things (IoT) device, etc.

The host 110 may control an overall operation of the computer system 100. In an embodiment, the host 110 may be one of various processors such as a central processing unit (CPU), a graphics processing unit (GPU), a neural processing unit (NPU), a data processing unit (DPU), and the like. In an embodiment, the host 110 may include a single core processor or a multi-core processor.

The host 110 may generate a signal for the storage devices 150 and/or the memory 120. The signal may include a command and an address. In an embodiment, the command may include a command such as a write command or a read command. In an embodiment, the command may include an activate command and a read/write command. In an embodiment, the command may further include a precharge command, a refresh command, or the like.

The activate command may be a command for converting a target row of a memory within the storage device 150 to an active state in order to write data to or read data from the storage device 150. Alternatively, the activate command may be a command that converts a target row within the memory 120 to an active state in order to write data to or read data from the memory 120. The storage devices 150 and/or the memory 120 may activate (e.g., drive) a memory cell of the target row in response to the activate command. The read/write command may be a command for performing a read or write operation on a target memory cell of a row converted to an active state.

The memory 120 may be used as a main memory or a system memory of the computer system 100. In an embodiment, the memory 120 may be a dynamic random access memory (DRAM) device, and may have a form factor of a dual in-line memory module (DIMM). However, the present disclosure is not limited thereto, and the memory 120 may include a non-volatile memory such as a flash memory, a parameter RAM (PRAM), a resistive RAM (RRAM), a magnetoresistive RAM (MRAM), or the like.

In an embodiment, the host 110 may be directly connected to the memory 120. In an embodiment, the memory 120 may communicate directly with the host 110 via a double data rate (DDR) interface. In an embodiment, the host 110 may include a memory controller configured to control the memory 120. However, the present disclosure is not limited thereto, and the memory 120 may communicate with the host 110 through various interfaces.

The host 110 and the storage devices 150 may be configured to share the same interface 140 with each other. For example, the host 110 and the storage devices 150 may communicate with each other through the interface 140. In an embodiment, the interface 140 may refer to a low-latency and high-bandwidth link that enables various connections between accelerators, memory devices, or various electronic devices by supporting coherency, memory access, and dynamic protocol multiplexing of IO protocol. For example, the interface 140 may be implemented as an I/O switch such as a Compute Express Link (CXL) switch. In addition, the host 110 and the storage devices 150 may communicate with each other based on various computing interfaces such as a GEN-Z protocol, an NVLink protocol, a CCIX protocol, an Open CAPI protocol, and the like.

The interface 140 and the storage devices 150 may include an address decoder. The address decoder may set storage positions in the memories of the storage devices 150. The memories may be host-managed device memories (HDMs) managed by the host 110. Accordingly, the storage devices 150 may transmit data to a specific position of the memory of a specific storage device 150 using the address decoder. For example, communication between the storage devices 150 may be possible by using the address decoder.

In an embodiment, when the interface 140 is implemented as the CXL switch, the interface 140 may provide different CXL protocols in which the host 110 and the storage devices 150 communicate. For example, the interface 140 may provide a CXL.io protocol, a CXL.mem protocol, and a CXL.cache protocol.

The CXL.io protocol may be a protocol most fundamentally supported by the storage devices 150. The host 110 may perform initial setting, memory capacity setting, virtualization, device search and connection, register access, or the like of the storage devices 150 using the CXL.io protocol.

The CXL.mem protocol may be a protocol that allows the host 110 to access the memories of the storage devices 150. The host 110 may recognize the memory of the storage device 150 as an additional memory space using the CXL.mem protocol. The CXL.mem protocol may support a memory of an architecture such as a volatile memory or a persistent memory.

The CXL.cache protocol may be a protocol that supports the storage devices 150 to access the memory 120 of the host 110 to implement cache coherence. The CXL.cache protocol may define an interaction between the host 110 and the storage devices 150, and the storage devices 150 may effectively cache the memory 120 of the host 110.

In an embodiment, the storage devices 150 may operate as a cache buffer of the host 110. For example, the host 110 may use the memories of the storage devices 150 as the cache buffer.

Each of the storage devices 150 may include a controller and a memory. The controller of the storage device 150 may include an intellectual property (IP) circuit designed to implement an application specific integrated circuit (ASIC) and/or a field-programmable gate array (FPGA). In an embodiment, the controller of the storage device 150 may be implemented to support the CXL protocol (e.g., a CXL 2.0 protocol, a CXL 3.0 protocol, or any other version). The controller of the storage device 150 may convert a CXL packet and signals of a memory interface of the memory 120 to each other.

The memory of the storage device 150 may include a volatile memory and a non-volatile memory. For example, the memory of the storage device 150 may include one of a dynamic random access memory (DRAM), a Not-AND (NAND) flash memory, a high bandwidth memory (HBM), a hybrid memory cube (HMC), a dual in-line memory Module (DIMM), an optane DIMM, a non-volatile memory DIMM (NVMDIMM), a double data rate synchronous DRAM (DDR SDRAM), and a low-power double data rate synchronous dynamic random access memory (LPDDR SDRAM), or a combination thereof. In an embodiment, the memory of the storage device 150 may operate as a cache buffer for each of the storage devices 150. For example, the memory of each of the storage devices 150 may be used as a cache buffer for the storage device 150.

In an embodiment, each of the storage devices 150 may be implemented as an individual memory device or an individual memory module. Each of the storage devices 150 may be connected to the interface 140 through different physical ports. For example, since the storage devices 150 are connected to the interface 140, a memory region managed by the host 110 may have a high capacity.

The storage devices 150 may form a Redundant Array of Inexpensive Disks (RAID) set to perform a RAID technique. In an embodiment, all of the storage devices 150 may form the RAID set, but the present disclosure is not necessarily limited thereto, and some of the storage devices 150 may form the RAID set. The storage devices 150 belonging to the RAID set may divide and store one piece of data. For example, each storage device 150 forming the RAID set among the storage devices 150 may store a divided data chunk. In this case, a logical block address (LBA) in which each storage device 150 stores a data chunk may be the same.

One of the storage devices 150 may operate as a parity storage device for storing parity. For example, the n-th storage device 150_n may be the parity storage device. The data chunk stored in the n-th storage device 150_n may be parity data chunk. The parity data chunk may be generated by performing an XOR operation on data chunks stored in the storage devices (e.g., the first to (n-1)-th storage devices 150_1 to 150_n) excluding the n-th storage device 150_n among the storage devices 150. The host 110 may generate the parity data chunk by performing the XOR operation on the data chunks of the first to (n-1)-th storage devices 150_1 to 150_n. The host 110 may store the parity data chunk in the n-th storage device 150_n.

When a data chunk of one of the storage devices 150 (e.g., the first storage device 150_1) has an error, the storage devices 150 may perform recovery. The recovery may be referred to as RAID recovery, RAID rebuild, RAID reconstruction, or the like.

In an embodiment, the first storage device 150_1 may report to the host 110 when the data chunk has the error. In another embodiment, the host 110 may detect that the data chunk of the first storage device 150_1 has the error through monitoring. When the data chunk of the first storage device 150_1 has the error, the host 110 may instruct the second to n-th storage devices 150_2 to 150_n that are the remaining storage devices to perform recovery. The second to n-th storage devices 150_2 to 150_n may transmit data for recovery to the first storage device 150_1 in response to a command of the host 110. For example, one or more of the second to n-th storage devices 150_2 to 150_n may receive the command from the host 110, and may transmit the data for recovery to the first storage device 150_1 in response to the command.

The host 110 may transmit the command and a token to each of the second to n-th storage devices 150_2 to 150_n so that the second to n-th storage devices 150_2 to 150_n perform recovery. The token may be used for end-to-end (E2E) verification of data generated by each storage device 150. In an embodiment, the host 110 may generate the token based on an identifier (e.g., a device number or the like) and the LBA of the storage device 150. For example, the host 110 may generate a value obtained by combining the identifier and the LBA of the storage device 150 as the token of the storage device 150. As another example, the host 110 may generate a random value using a random function as the token of the storage device 150. In an embodiment, the random function may be a hash function, and the random value may represent a hash value. Accordingly, each of the second to n-th storage devices 150_2 to 150_n may generate and transmit a data packet including the token to the first storage device 150_1.

The host 110 may access the second to n-th storage devices 150_2 to 150_n using the interface 140. For example, the host 110 may access the storage devices 150 using the CXL.mem protocol. The at least one storage device 150 may communicate with each other using the interface 140. For example, the second to n-th storage devices 150_2 to 150_n may communicate with the first storage device 150_1 using the interface 140. In an embodiment, the second to n-th storage devices 150_2 to 150_n may access the first storage device 150_1 using the interface 140.

The first storage device 150_1 may receive the data packets from the second to n-th storage devices 150_2 to 150_n. For example, the first storage device 150_1 may receive the data packets from the second to n-th storage devices 150_2 to 150_n. The first storage device 150_1 may perform recovery based on the data packets. The first storage device 150_1 may receive a recovery command from the host 110. The recovery command may instruct the first storage device 150_1 to perform integrity verification, and may instruct the first storage device 150_1 to perform recovery using the data packets if the integrity verification is successful. The first storage device 150_1 may perform E2E verification in response to the recovery command. For example, the first storage device 150_1 may receive token values for the second to n-th storage devices 150_2 to 150_n from the host 110 for the E2E verification. The first storage device 150_1 may determine whether values of tokens received from the second to n-th storage devices 150_2 to 150_n match values of tokens received from the host 110. When the E2E verification is successful, the first storage device 150_1 may perform recovery based on the data chunks of the second to n-th storage devices 150_2 to 150_n. The first storage device 150_1 may store a recovered data chunk.

In a case of a conventional computer system, the storage devices 150 including the RAID set transfer data chunks to the memory 120, and the host 110 performs recovery. Accordingly, a bottleneck occurs in the host 110 and an idle state occurs in the storage devices 150 so that there is a problem in which a resource is not used efficiently. However, since the storage devices 150 may communicate with each other through the interface 140 without going through the host 110 and the storage devices 150 may perform recovery in the computer system 100 according to the embodiment, recovery time may be shortened while efficiently using a resource.

In FIG. 1, a configuration in which the data chunk of the first storage device 150_1 has the error has been described, but the same description may be applied even when one of the data chunks of the second to n-th storage devices 150_2 to 150_n has an error.

Figure 2:
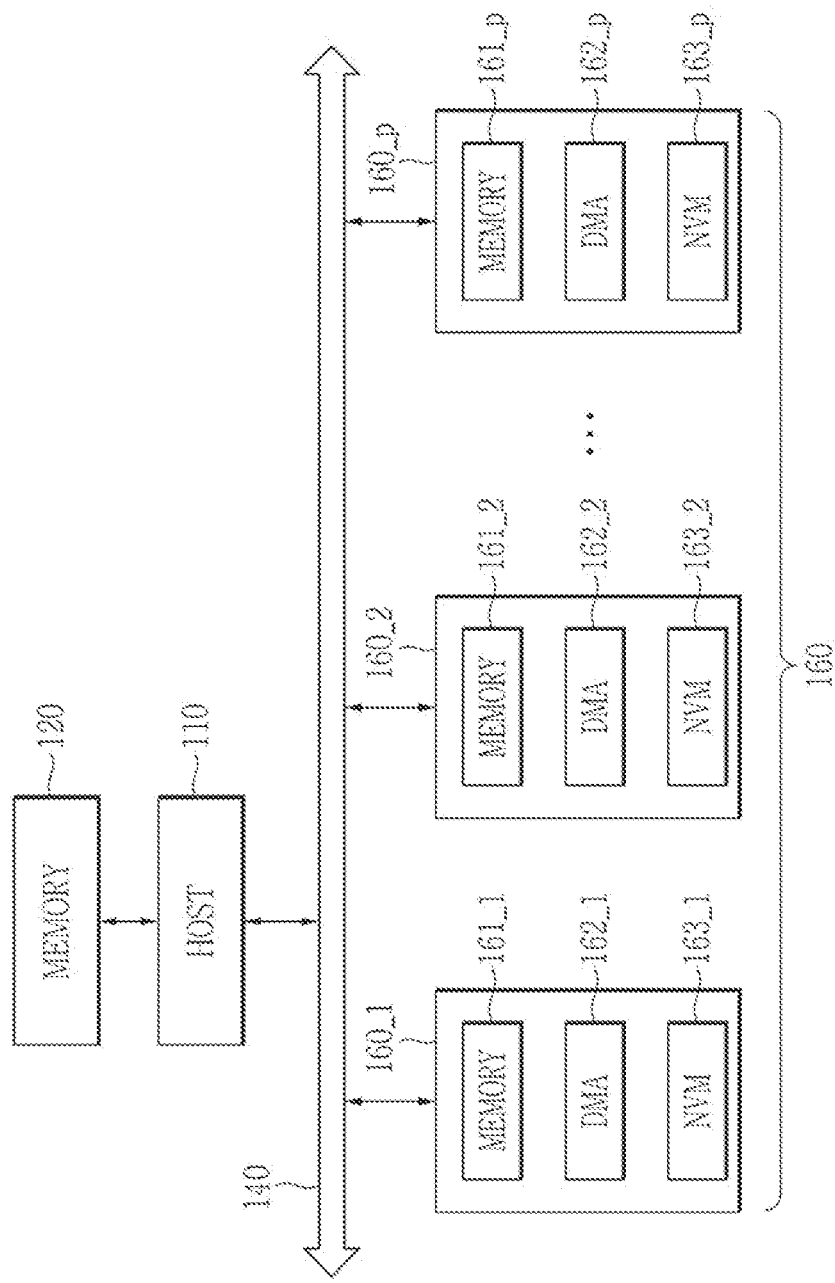
FIG. 2 is a schematic block diagram of a storage device according to an example embodiment.

FIG. 2 is a schematic block diagram of the storage device according to an example embodiment.

Referring to FIG. 2, the computer system 100_1 may include a host 110, a memory 120, and at least one storage device 160. The computer system 100_1 may be used by a plurality of users, and each user may use the storage devices 160 through the host 110. The storage devices 160 may include first to p-th storage devices 160_1 to 160_p (p is an integer greater than 1). The host 110 and the storage devices 160 may be configured to share the same interface 140 with each other. For example, the host 110 and the storage devices 160 may communicate with each other through the interface 140.

The interface 140 and the storage devices 160 may include an address decoder. The address decoder may set storage positions in the memories of the storage devices 160. The memories may be host-managed device memories (HDMs) managed by the host 110. Accordingly, the storage devices 160 may transmit data to a specific position of the memory of a specific storage device 160 using the address decoder. For example, communication between the storage devices 160 may be possible by using the address decoder.

In an embodiment, when the interface 140 is implemented as the CXL switch, the interface 140 may provide different CXL protocols in which the host 110 and the storage devices 160 communicate. For example, the interface 140 may provide a CXL.io protocol, a CXL.mem protocol, and a CXL.cache protocol, as discussed above in connection with FIG. 1.

Referring to FIG. 2, each of the storage devices 160 according to the embodiment may include a memory 161 (e.g., first to p-th memories 161_1 to 161_p), a direct memory access (DMA) engine 162 (e.g., first to p-th DMA engines 162_1 to 162_p), and a non-volatile memory 163 (e.g., first to p-th non-volatile memories 161_3 to 163_p).

The memory 161 may be a host-managed device memory (HDM) managed by the host 110. For example, the memory 161 may be a volatile memory, but the present disclosure is not necessarily limited thereto, and the memory 161 may be implemented as a non-volatile memory such as a single level cell (SLC) type of flash memory. The memory 161 may receive and store data packets from other storage devices 160. For example, the memory 161_1 of a first storage device 160_1 may receive and store data packets received from storage devices 160_2 to 160_p. The other storage devices 160_2 to 160_p may form the RAID set together with the first storage device 160_1. Each of the storage devices 160_1 to 160_p forming the RAID set may have the same configuration and operation as each other.

The storage devices 160 forming the RAID set may store the data chunks in a data format of Data Integrity Field (DIF)/Data Integrity Extension (DIX). The data format of DIF/DIX may include a data chunk field, a reference tag field, an application tag field, and a guard field. The reference tag field may include LBA information. The application tag field may include application information configured by an application layer (e.g., an operating system or the like) of the host 110. The guard field may include a cyclic redundancy check (CRC) code for verifying integrity of the data chunk. The storage device 160 may store the data chunks in the non-volatile memory 163.

When the data chunk stored in the first storage device 160_1 has an error, the host 110 may transmit the read command and the token to the other storage devices 160_2 to 160_p forming the RAID set. In this case, the host 110 may transmit different tokens to the first to p-th storage devices 160_1 to 160_p. Conventionally, all LBA information of data packets of the storage devices forming the RAID set was the same. Therefore, even if one storage device overwrote the data packet at a position of the other storage device, there was a problem in which it was difficult to detect this. However, since the first to p-th storage devices 160_1 to 160_p according to an embodiment use the tokens that are distinguished from each other, an overwrite problem may be detected through the E2E verification even if the overwrite problem occurs.

For example, when the first to p-th storage devices 160_1 to 160_p form the RAID set, the host 110 may generate p tokens. The host 110 may transmit a corresponding token to each of the first to p-th storage devices 160_1 to 160_p. For example, the host 110 may transmit a first token to a first storage device 160_1, may transmit a second token to a second storage device 160_2, and may transmit a p-th token to a p-th storage device 160_p. The host 110 may generate one of the p tokens based on an XOR operation. For example, the host 110 may generate the p-th token by performing the XOR operation on first to (p-1)-th tokens, a reference tag, and an application tag. However, the embodiment is not necessarily limited thereto, and the host may generate any one token among the p tokens in the above-described manner.

The read command may be a command instructing one storage device 160 to read data stored in the one storage device 160 to write the read data in any of the other storage devices 160. For example, the read command may instruct a first storage device 160_1 to read data stored in the first storage device 160_1 and to write the read data in any of the other storage devices 160_2 to 160_p. After receiving the read command, the one storage device 160 may read data, and then may write (or record) the read data in the other storage device 160 through the interface 140 without going through the host 110. For example, other storage devices 160_2 to 160_p may write the data packets in the memory 161_1 of the first storage device 160_1 in response to the read command from the host 110. In an example embodiment, when a second storage device 160_2 receives the read command and the token together, the second storage device 160_2 may read data that the second storage device 160_2 stores and may transmit the read data to a storage device indicated by the read command (e.g., first storage device 160_1) so that the second storage device 160_2 writes the read data in the storage device indicated by the read command (e.g., first storage device 160_1).

The other storage devices 160_2 to 160_p may read the data chunk in response to the read command. The other storage devices 160_2 to 160_p may generate the data packet based on the read data chunk and the token received from the host 110. For example, the other storage devices 160_2 to 160_p may update (or change) the reference tag field and the application tag field to a token field in the data format of DIF/DIX. A sum of a size of the reference tag field and a size of the application tag field may be equal to a size of the token field. The token may be generated by the host 110 based on the random function or based on the identifier and the LBA. The other storage devices 160_2 to 160_p may transmit the generated data packets to the first storage device 160_1. The first storage device 160_1 may write (or record) the data packets of the other storage devices 160_2 to 160_p in the memory 161_1.

The DMA engine 162 may perform a recovery operation based on the received data packets. The DMA engine 162 may recover the data chunk having the error through the recovery operation. The data chunk having the error may refer to a data chunk that the storage device 160 stores in the non-volatile memory 163. The DMA engine 162 may store the recovered data chunk in the non-volatile memory 163.

The DMA engine 162 may perform a logical operation for the recovery operation on the data packets of the other storage devices. For example, the DMA engine 162 may perform an exclusive OR (XOR) operation. The DMA engine 162 may perform the XOR operation on the data chunks or the tokens received from the other storage devices 160. For example, the DMA engine 162 may recover the data chunk having the error by performing the XOR operation on the received data chunks. The DMA engine 162 may obtain a reference tag and an application tag by performing the XOR operation on the received tokens. For example, the DMA engine 162 may obtain the reference tag and the application tag by performing the XOR operation on first to p-th tokens.

The DMA engine 162 may determine whether the obtained reference tag and application tag match a reference tag and an application tag of the data chunk having the error stored in the non-volatile memory 163. The DMA engine 162 may store the recovered data chunk in the non-volatile memory 163 based on the reference tag and the application tag when the determination result is matched. The DMA engine 162 may perform an abnormality report to the host 110 when the determination result is not matched.

DMA engine 162 may perform integrity verification using the tokens. The integrity verification may include the E2E verification. The E2E verification may be performed to verify whether the storage device 160 correctly receives the data packets from the other storage devices 160. For example, when the data chunk stored in the first storage device 160_1 has an error, the first storage device 160_1 may receive the second to p-th tokens from the host 110. The second to p-th tokens received by the first storage device 160_1 from the host 110 may be the same as the second to p-th tokens transmitted by the host 110 to the other storage devices 160_2 to 160_p. The DMA engine 162_1 may compare the second to p-th tokens received from the host 110 with the second to p-th tokens received from the other storage devices 160_2 to 160_p. The DMA engine 162_1 may determine that the E2E verification is successful if the second to p-th tokens received from the host 110 match the second to p-th tokens received from the other storage devices 160_2 to 160_p and the E2E verification fails if any of the second to p-th tokens received from the host 110 do not match the second to p-th tokens received from the other storage devices 160_2 to 160_p. The storage device 160 may request retransmission of the data packet to the storage device 160 corresponding to the data packet in which the E2E verification fails. In example embodiments, the DMA engine 162 may request the retransmission of the data packet from the corresponding storage device through the host 110 or may directly request the retransmission to the data packet from the corresponding storage device through the interface 140. For example, if the E2E verification of the second token by the DMA engine 162_1 of the first storage device 160_1 fails, the DMA engine 162_1 may request the retransmission of data from the second storage device 160_2 through the host 110 or may directly request the retransmission of data from the second storage device 160_2 through the interface 140. The DMA engine 162 may perform the XOR operation on the data chunks if the E2E verification succeeds.

The non-volatile memory 163 may store the data chunks. When the stored data chunk has an error, the non-volatile memory 163 may store a recovered data chunk generated as a result of recovery of the storage device 160. The non-volatile memory 163 may output the data chunk in response to the read command of the host 110. The output data chunk may be transferred to the storage device having an error among the storage devices forming the RAID set to be used for recovery. For example, when the data chunk stored in the first storage device 160_1 has an error, an output data chunk may be transferred from one or more of the non-volatile memories 163_2 to 163_p of the second to p-th storage devices 160_2 to 160_p to the first storage device 160_1 to be used for recovery.

Figure 3:
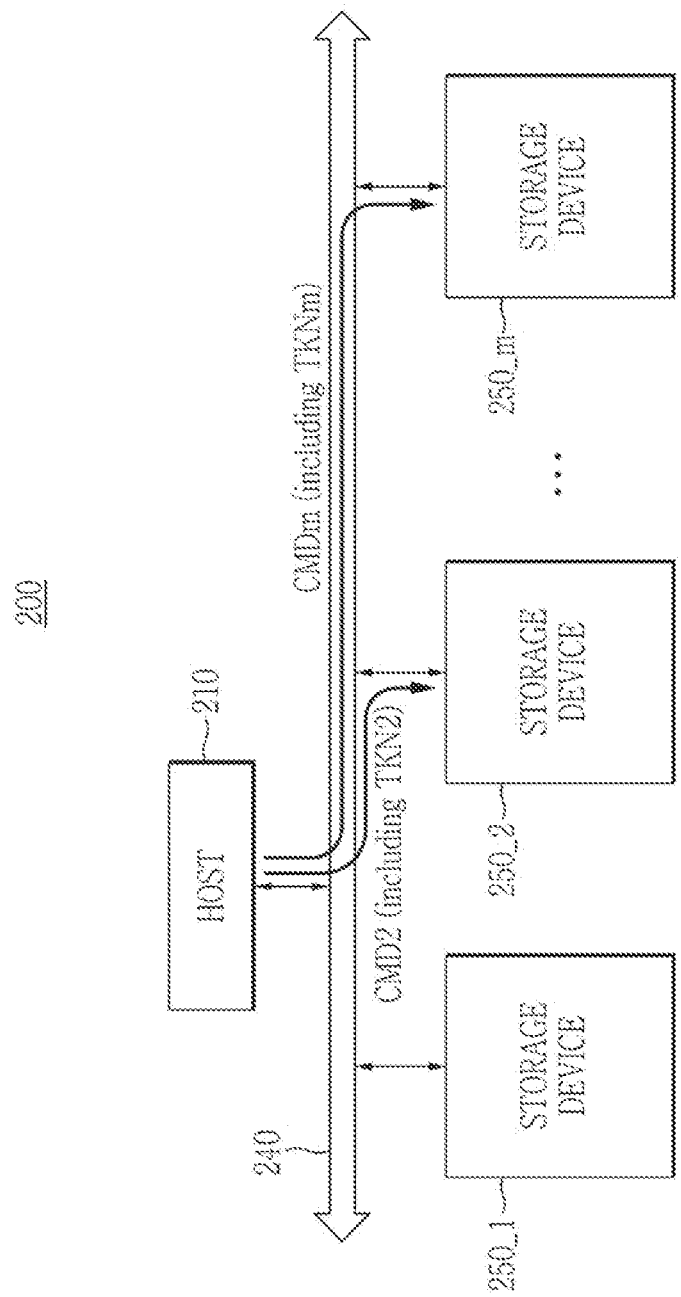
FIG. 3 is a view for explaining a recovery operation of the computer system according to an example embodiment.
Figure 4:
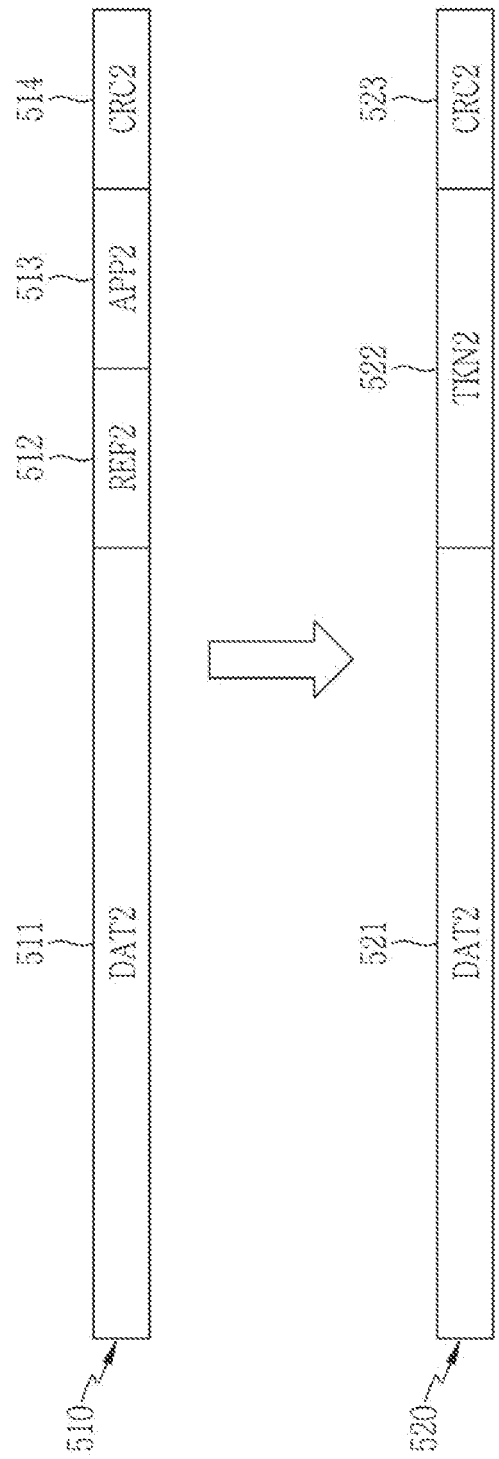
FIG. 4 illustrates a data packet generated by the storage device for the recovery operation according to an example embodiment.
Figure 5:
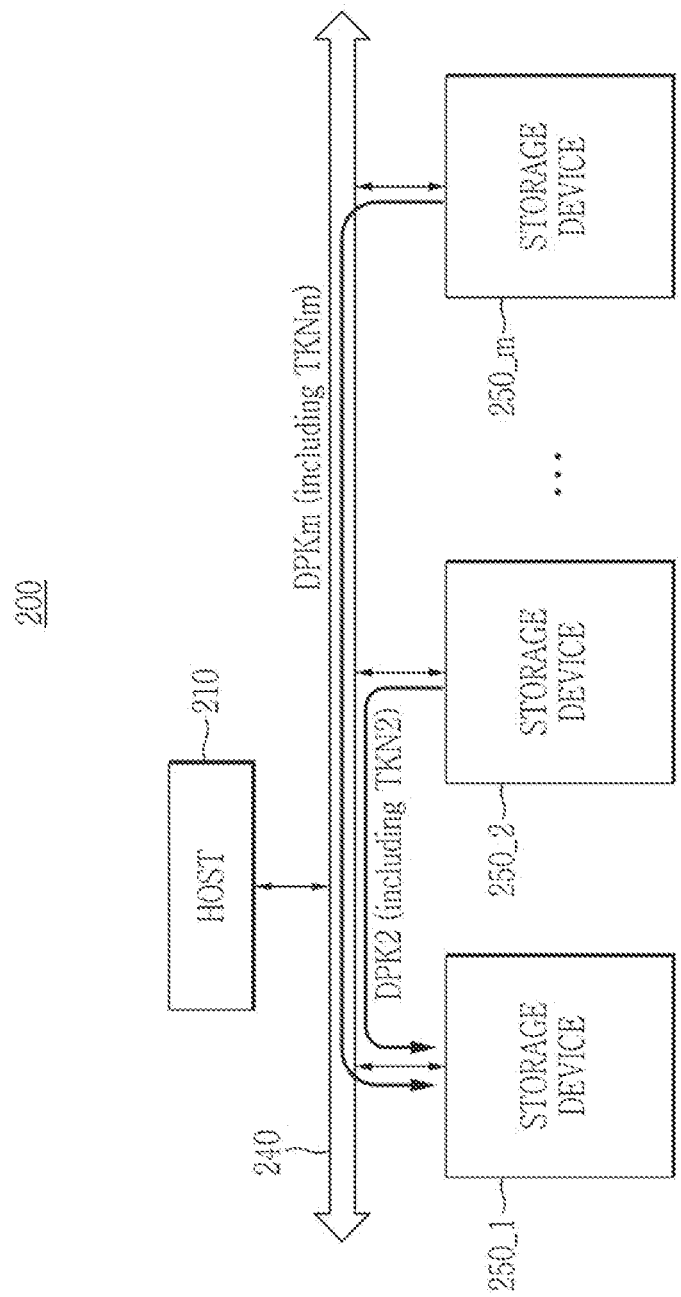
FIG. 5 is a view for explaining a recovery operation of the computer system according to an example embodiment.
Figure 6:
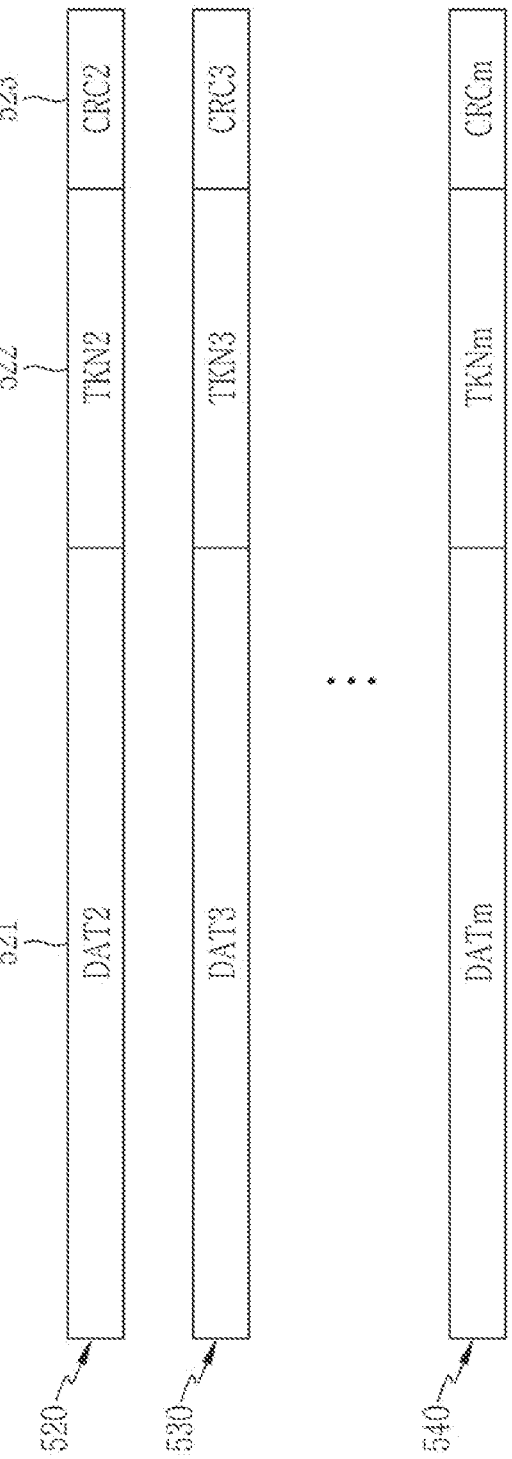
FIG. 6 illustrates data packets received by the storage device according to an example embodiment.
Figure 7:
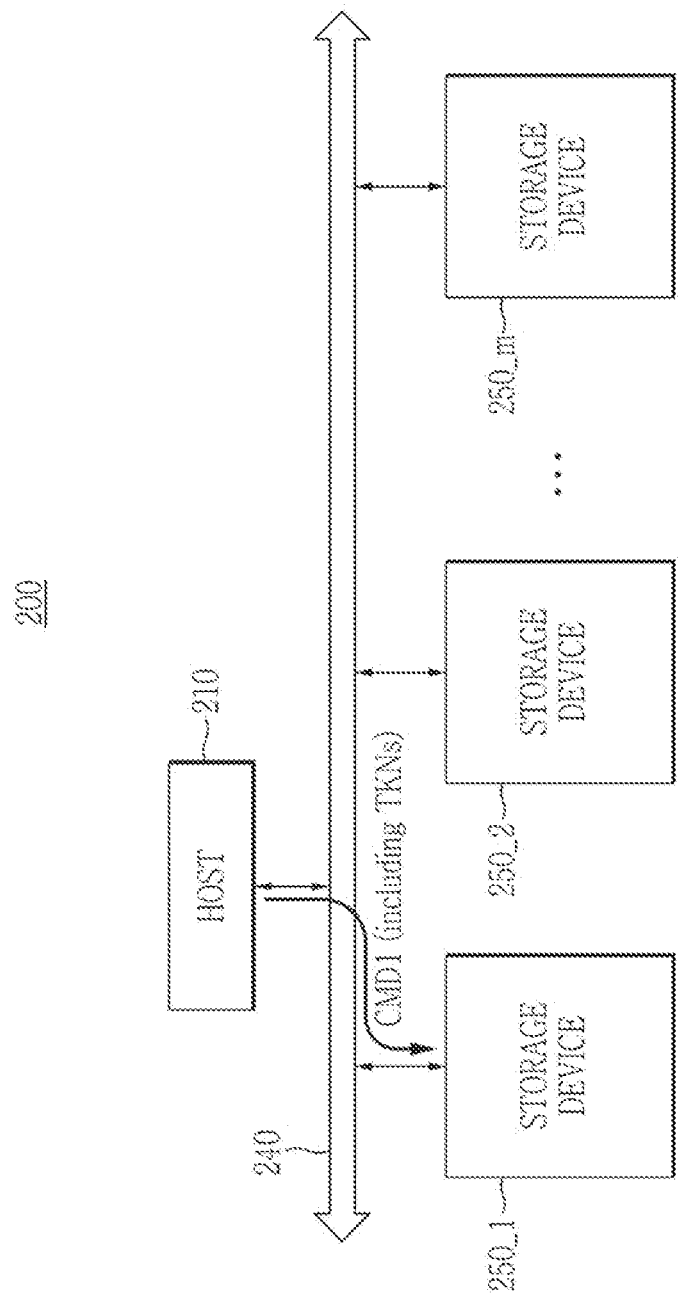
FIG. 7 is a view for explaining a recovery operation of the computer system according to an example embodiment.
Figure 8:
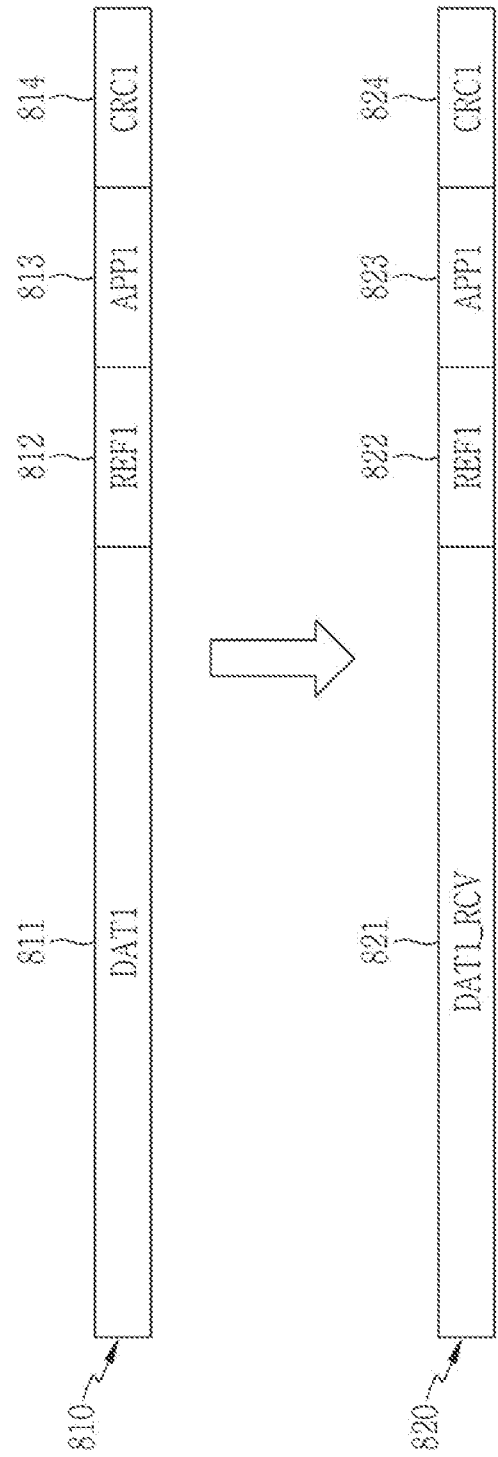
FIG. 8 illustrates a data packet generated by the storage device through the recovery operation according to an example embodiment.

FIG. 3 to FIG. 8 are views for explaining a recovery operation of the computer system according to an example embodiment. FIGS. 4, 6, and 8 among FIG. 3 to FIG. 8 are views for explaining the data packet used in the recovery operation.

Referring to FIG. 3, the computer system 200 according to the embodiment may include a host 210, an interface 240, and storage devices 250_1 to 250_m (m is an integer greater than 1). The storage devices 250_1 to 250_m may form the RAID set, and each of the storage devices may store a divided data chunk. The host 210 may correspond to host 110 of FIGS. 1 and 2, the interface 240 may correspond to interface 140 of FIGS. 1 and 2, and the storage devices 250_1 to 250_m may correspond to storage devices 150_1 to 150_n of FIG. 1 or storage devices 160_1 to 160_p of FIG. 2.

The host 210 may write (or record) data chunks in the storage devices 250_1 to 250_m. One (e.g., the m-th storage device 250_m) of the storage devices 250_1 to 250_m may be a parity storage device. The host 210 may generate parity data chunk by performing the XOR operation on the data chunks of the first to (m-1)-th storage devices 250_1 to 250_m-1, and may write the generated parity data chunk in the m-th storage device 250_m.

When the data chunk of one (e.g., the first storage device 250_1) of the storage devices 250_1 to 250_m has an error, the host 210 may instruct the storage devices 250_1 to 250_m to perform recovery.

The host 210 may access the storage devices 250_1 to 250_m through the interface 240. The storage devices 250_1 to 250_m may communicate with the host 210 through the interface 240 or may communicate with each other directly (e.g., without going through the host 210). For example, the interface 240 may be the CXL switch.

The host 210 may transmit commands CMD2 to CMDm to the second to m-th storage devices 250_2 to 250_m that do not have errors among the storage devices 250_1 to 250_m. The commands CMD2 to CMDm may be commands that read data from a storage device (i.e., any one of the second to m-th storage devices 250_2 to 250_m) to write the read data in another storage device (i.e., the first storage device 250_1). The host 210 may transmit an address of a memory of the first storage device 250_1, tokens TKN2 to TKNm, a chunk LBA, and a chunk size together with the commands CMD2 to CMDm. The second to m-th storage devices 250_2 to 250_m may transmit the data chunks stored in the second to m-th storage devices to the first storage device 250_1 based on signals received from the host 210. The data chunks of the second to m-th storage devices 250_2 to 250_m may be used to recover the data chunk of the first storage device 250_1.

The commands CMD2 to CMDm may include the tokens TKN2 to TKNm corresponding to the second to m-th storage devices 250_2 to 250_m. The tokens TKN2 to TKNm may be used to distinguish the data chunks of the second to m-th storage devices 250_2 to 250_m. The host 210 may generate the tokens TKN2 to TKNm using a random function or may generate the tokens TKN2 to TKNm based on an identifier and an LBA of each of the second to m-th storage devices 250_2 to 250_m. In another embodiment, the host 210 may individually transmit the commands CMD2 to CMDm and the tokens TKN2 to TKNm.

In an embodiment, the host 210 may generate the tokens TKN2 to TKNm-1 by incrementing a bit. That is, the host 210 may generate the token TKN2, and may increment a bit of the token TKN2 to generate the token TKN3. Similarly, the host 210 may generate a next token TKN4 by incrementing a bit of the token TKN3, and may generate the token TKNm-1 by incrementing a bit of the token TKNm-2.

In an embodiment, in order to generate the token TKNm, the host 210 may use the remaining tokens TKN2 to TKNm-1 and a reference tag and an application tag of the first storage device 250_1. The host 210 may generate the token TKNm using an XOR operation on the remaining tokens TKN2 to TKNm-1, the reference tag, and the application tag. For example, the host 210 may generate the token TKNm using Equation 1.

$$TKNm = TKN2 \oplus TKN3 \oplus \ldots TKNm-1 \oplus (REF \text{ and } APP) \quad \text{(Equation 1)}$$

Here, the TKNm may be a token transmitted by the host 210 to the m-th storage device 250_m. The TKN2 may be a token transmitted by the host 210 to the second storage device 250_2, the TKN3 may be a token transmitted by the host 210 to the third storage device 250_3, and the TKNm-1 may be a token transmitted by the host 210 to the (m-1)-th storage device 250_m-1. The REF and the APP may be the reference tag and the application tag of the data chunk, respectively, of the first storage device 250_1.

The second to m-th storage devices 250_2 to 250_m may generate data packets using the tokens TKN2 to TKNm in response to the commands CMD2 to CMDm. For example, the second to m-th storage devices 250_2 to 250_m may store a data chunk in a data format of DIF/DIX in a non-volatile memory. The second to m-th storage devices 250_2 to 250_m may generate the data packets by filling reference tag fields and an application tag fields with the tokens TKN2 to TKNm in the data format of DIF/DIX.

FIG. 4 illustrates a configuration in which the second storage device 250_2 generates a data packet 520 from data 510. Referring to FIG. 4, the second storage device 250_2 may store the data 510 in the non-volatile memory. The data 510 may have the data format of DIF/DIX. For example, the data 510 may include a data chunk field 511, a reference tag field 512, an application tag field 513, and a guard field 514. The data chunk field 511 may include a data chunk DAT2 used for recovery. The data chunk DAT2 used for recovery may be normal, and may not have an error. The reference tag field 512 may include a reference tag REF2 for LBA information. The application tag field 513 may include an application tag APP2 for application information. The guard field 514 may include a CRC code CRC2 for integrity verification of the data chunk DAT2.

The second storage device 250_2 may generate a data packet 520 from the data 510. The second storage device 250_2 may generate the data packet 520 by filling the reference tag field 512 and the application tag field 513 with the token TKN2 received from the host. The data packet 520 may include a data chunk field 521, a token field 522, and a guard field 523. The token field 522 may include the token TKN2 received from the host, and a size of the token field 522 may be equal to a sum of a size of the reference tag field 512 and a size of the application tag field 513. The data chunk field 521 and the guard field 523 of the data packet 520 may be substantially the same as the data chunk field 511 and the guard field 514 of the data 510.

Referring to FIG. 5, the second to m-th storage devices 250_2 to 250_*m* may transmit data packets DPK2 to DPKm to the first storage device 250_1. The second to m-th storage devices 250_2 to 250_*m* may access the first storage device 250_1 through the interface 240 without going through the host 210. The first storage device 250_1 may write the data packets DPK2 to DPKm in a memory (e.g., a host-managed device memory (HDM) managed by the host).

FIG. 6 shows data packets 520 to 540 received by the first storage device 250_1 from the second to m-th storage devices 250_2 to 250_*m* to be written in the memory of the first storage device 250_1. Referring to FIG. 6, the first storage device 250_1 may store in its memory the data packet 520 transmitted by the second storage device 250_2, a data packet 530 transmitted by the third storage device 250_3, and a data packet 540 transmitted by the m-th storage device 250_*m*.

Each of the data packets 520 to 540 may include the data chunk field 521, the token field 522, and the guard field 523. The data packet 520 may include the data chunk DAT2, the token TKN2, and the CRC code CRC2. The data packet 530 may include a data chunk DAT3, a token TKN3, and a CRC code CRC3. The data packet 540 may include a data chunk DATm, a token TKNm, and a CRC code CRCm.

Referring to FIG. 7, the host 210 may transmit a command CMD1 to the first storage device 250_1. The command CMD1 may be a command instructing the first storage device 250_1 to perform recovery. The command CMD1 may include the tokens TKNs (TKN2 to TKNm). When the second to m-th storage devices 250_2 to 250_*m* complete transmission of the data packets 520 to 540 to the first storage device 250_1, the host 210 may transmit the command CMD1 to the first storage device 250_1. The host 210 may also transmit the tokens TKN2 to TKNm transmitted to the second to m-th storage devices 250_2 to 250_*m* to the first storage device 250_1. The first storage device 250_1 may store the tokens TKN2 to TKNm in the memory of the first storage device 250_1. In another embodiment, the host 210 may individually transmit the command CMD1 and the tokens TKN2 to TKNm.

The first storage device 250_1 may perform integrity verification in response to the command CMD1. The integrity verification may include the E2E verification. For example, the first storage device 250_1 may determine whether the tokens TKN2 to TKNm received from the second to m-th storage devices 250_2 to 250_*m* match the tokens TKN2 to TKNm received from the host 210. The first storage device 250_1 may determine the E2E verification to be successful if the tokens TKN2 to TKNm received from the second to m-th storage devices 250_2 to 250_*m* match the tokens TKN2 to TKNm received from the host 210, and may determine the E2E verification to fail if any of the tokens TKN2 to TKNm received from the second to m-th storage devices 250_2 to 250_*m* do not match the tokens TKN2 to TKNm received from the host 210.

When the E2E verification fails, the first storage device 250_1 may re-request the data packet of the storage device of the storage devices 250_2 to 250_*m* corresponding to the token that is not matched. For example, the first storage device 250_1 may re-request the data packet to the host 210 or may directly re-request the data packet to the corresponding storage device of the storage devices 250_2 to 250_*m*.

The first storage device 250_1 may perform recovery when the E2E verification is successful. The first storage device 250_1 may generate recovered data by performing an XOR operation on the data chunks DAT2 to DATm stored in the memory. The first storage device 250_1 may store the recovered data in a non-volatile memory of the of the first storage device 250_1.

FIG. 8 illustrates the recovered data 820 generated by the first storage device 250_1 through the recovery. The first storage device 250_1 may generate the recovered data 820 by recovering data 810. The data 810 may have the data format of DIF/DIX. For example, the data 810 may include a data chunk field 811, a reference tag field 812, an application tag field 813, and a guard field 814. The data chunk field 811 may include a data chunk DAT1, the reference tag field 812 may include a reference tag REF1, the application tag field 813 may include an application tag APP1, and the guard field 814 may include a CRC code CRC1.

The data chunk DAT1 of the data 810 may have an error. The first storage device 250_1 may generate the recovered data 820 from the data chunks DAT2 to DATm. The recovered data 820 may have the data format of DIF/DIX. For example, the recovered data 820 may include a data chunk field 821, a reference tag field 822, an application tag field 823, and a guard field 824. The data chunk field 821 may include a recovered data chunk DAT1_RCV, the reference tag field 822 may include the reference tag REF1, the application tag field 823 may include the application tag APP1, and the guard field 824 may include the CRC code CRC1. For example, the first storage device 250_1 may write the recovered data chunk DAT1_RCV instead of the data chunk DAT1 having the error in the data chunk field 821.

The first storage device 250_1 may obtain a reference tag and an application tag by performing an XOR operation on the tokens TKN2 to TKNm. The first storage device 250_1 may determine whether the obtained reference tag and application tag match the reference tag REF1 and the application tag APP1 of the data 810. When it is determined that the obtained reference tag and application tag match the reference tag REF1 and the application tag APP1 of the data 810, the first storage device 250_1 may write the recovered data 820 in the non-volatile memory of the first storage device 250_1. When it is not determined that the obtained reference tag and application tag match the reference tag REF1 and the application tag APP1 of the data 810, the first storage device 250_1 may perform an abnormality report to the host 210, and may not write the recovered data 820 in the non-volatile memory.

Figure 9:
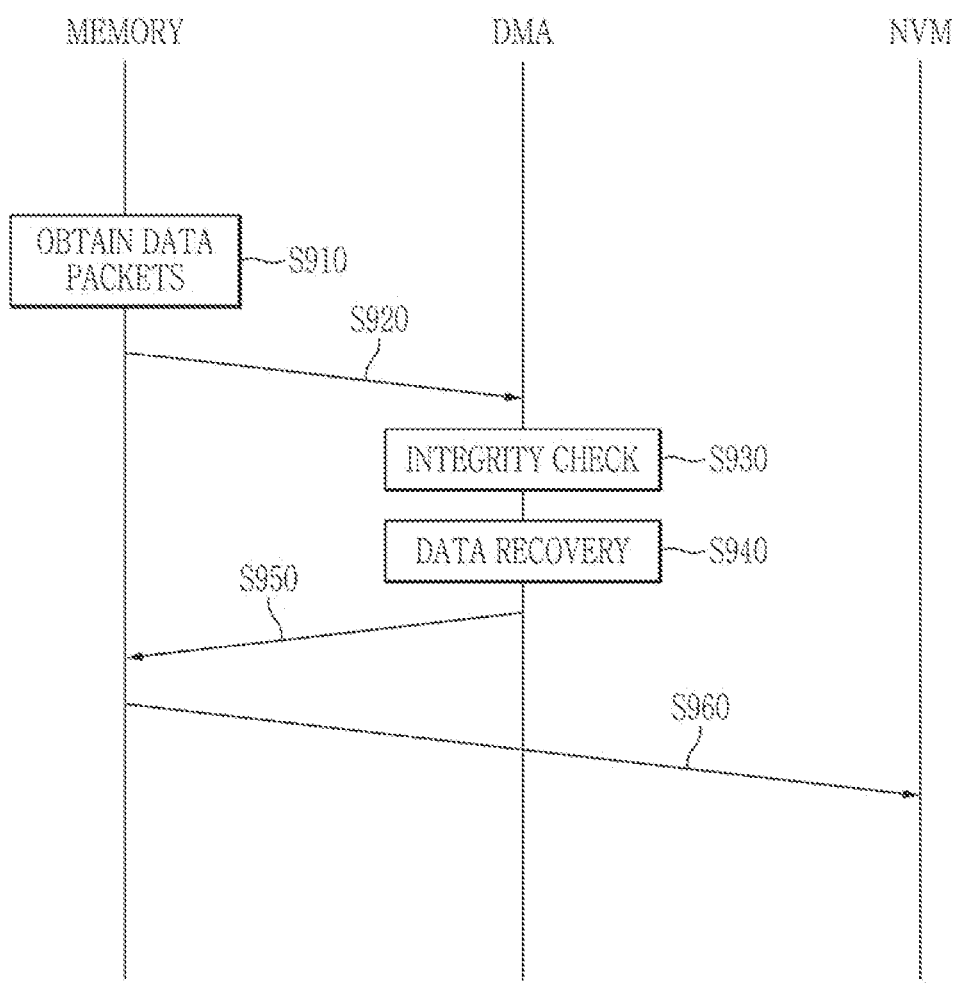
FIG. 9 is a flowchart illustrating a recovery method of the storage device according to an example embodiment.

FIG. 9 is a flowchart illustrating a recovery method of the storage device according to an example embodiment.

Referring to FIG. 9, the storage device according to the embodiment may form the RAID set with the other storage devices. For convenience of description, the storage devices forming the RAID set may be expressed as first to q-th storage devices. Here, the storage device of FIG. 9 may be expressed as the first storage device, and the other storage devices may be expressed as the second to q-th storage devices. The first to q-th storage devices may correspond to the storage devices 160_1 to 160_*n* of FIG. 2. When a data chunk of the first storage device has an error, the first storage device may perform recovery using data chunks of the second to q-th storage devices.

The first storage device according to an example embodiment may include a memory MEMORY, a DMA engine DMA, and a non-volatile memory NVM. The memory of the first storage device may be a volatile memory, but the present disclosure is not necessarily limited thereto, and the memory may be implemented as a non-volatile memory such as an SLC type of flash memory. Similarly, each of the second to q-th storage devices may also include a memory, a DMA engine, and a non-volatile memory, which are the same as the memory MEMORY, the DMA engine DMA, and the non-volatile memory NVM, respectively, of the first storage device. The memory MEMORY, the DMA engine DMA, and the non-volatile memory NVM of the first storage device may correspond to the memory 161_1, the DMA engine 162_1, and the non-volatile memory 163_2, respectively, of FIG. 2.

The memory of the first storage device may obtain data packets of the second to q-th storage devices (S910). Each of the data packets may include a data chunk, a token, and a CRC code. The data chunk may be data divided into the first to q-th storage devices forming the RAID set for the recovery. The token may be used to distinguish the second to q-th storage devices. The CRC code may be a code for verifying integrity of the data chunk.

The host (e.g., host 110) may detect that the data of the first storage device has the error, and may transmit a command and a token to the second to q-th storage devices. Tokens transmitted by the host to the second to q-th storage devices may be different from each other. The command transmitted by the host may instruct each of the second to q-th storage devices to read the data chunk stored in their respective non-volatile memories and write the read data chunk in the first storage device. For example, the second to q-th storage devices may transmit the data chunks to the first storage device in response to the command of the host.

The second to q-th storage devices may generate the data packets including the data chunks, and may transmit the generated data packets to the first storage device. The second to q-th storage devices may generate the data packets by changing a reference tag field and an application tag field corresponding to the data chunk to a token field. The first storage device may store the received data packets in the memory MEMORY.

The memory MEMORY may transmit the data packets to the DMA engine DMA (S920). In an embodiment, when the first storage device receives a recovery command from the host (e.g., host 110), the memory MEMORY may transfer the data packets to the DMA engine DMA. The host may transmit the recovery command to the first storage device when the second to q-th storage devices transmit the data packets to the first storage device.

When the DMA engine DMA receives the data packets from the memory MEMORY, the DMA engine DMA may perform integrity verification on the data packets (S930). The integrity verification may include the E2E verification. For example, the DMA engine DMA may verify whether the data packets are correctly received from the second to q-th storage devices.

The first storage device may receive the tokens from the host (e.g., host 110). The host may also transmit the tokens transmitted to the second to q-th storage devices to the first storage device. The DMA engine DMA may determine whether the tokens received from the host match the tokens received from the second to q-th storage devices. In an embodiment, the host may transmit the tokens to the first storage device along with the recovery command. The first storage device may perform the integrity verification using the token and the CRC code of each data packet.

If at least one token is not matched, the DMA engine DMA may request data retransmission to the storage device corresponding to the token. For example, the first storage device may request retransmission to the host (e.g., host 110) or may directly request retransmission to the corresponding storage device of the second to q-th storage devices.

The DMA engine DMA may perform recovery if the tokens are matched (S940). The DMA engine DMA may generate a recovered data chunk by performing an XOR operation on the data chunks obtained from the second to q-th storage devices. In addition, the DMA engine DMA may obtain the reference tag and the application tag by performing an XOR operation on the tokens obtained from the second to q-th storage devices.

The DMA engine DMA may determine whether the obtained reference tag and application tag match a reference tag and an application tag of the non-volatile memory NVM. The DMA engine DMA may perform an abnormality report to the host (e.g., host 110) if the tags are not matched. The DMA engine DMA may write the recovered data chunk in the non-volatile memory NVM if the tags are matched.

The DMA engine DMA may transmit the recovered data chunk to the memory MEMORY (S950). The memory MEMORY may store the recovered data chunk, the reference tag, the application tag, and the CRC code as one data packet.

The memory MEMORY may transmit the data packet to the non-volatile memory NVM (S960). The memory MEMORY may function as a buffer memory. The first storage device may perform encryption, randomization, or the like on the data packet before storing the data packet in the non-volatile memory NVM.

Figure 10:
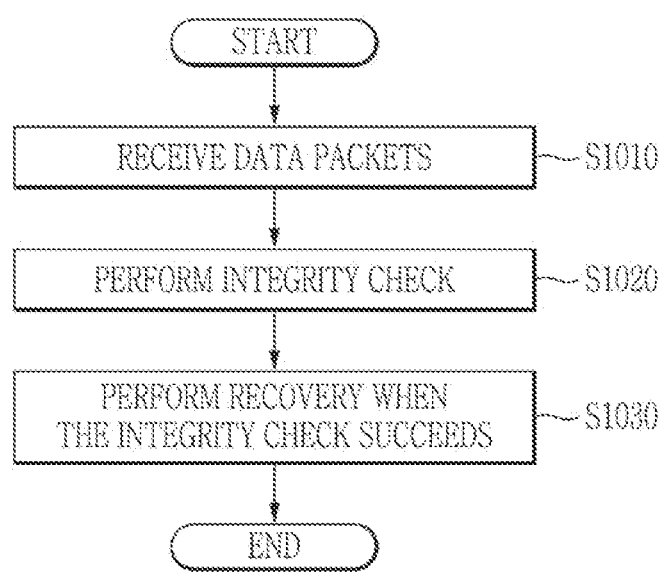
FIG. 10 is a flowchart of a recovery method according to an example embodiment.

FIG. 10 is a flowchart of a recovery method according to an example embodiment.

Referring to FIG. 10, the recovery method according to the embodiment may be performed by a first storage device among a plurality of storage devices forming a RAID set. The method of FIG. 10 may be performed by the storage devices 150 of FIG. 1 or the storage devices 160 of FIG. 2.

The first storage device (e.g., first storage device 150_1 or first storage device 160_1) may receive data packets from other storage devices (e.g., second to n-th storage device 150_2 to 150_n or second to p-th storage device 160_2 to 160_p) (S1010). The data packets may include a data chunk, a token, and a CRC code. The token may be used to distinguish the other storage devices (e.g., second to n-th storage device 150_2 to 150_n or second to p-th storage device 160_2 to 160_p), and may be generated by the host (e.g., host 110). In an embodiment, the token may be generated using a random function. In an embodiment, the token may be generated based on an identifier and an LBA of the storage device (e.g., first to n-th storage device 150_1 to 150_n or first to p-th storage device 160_1 to 160_p). In addition, one token among tokens included in the data packets may be generated based on the remaining tokens, a reference tag, and an application tag. For example, the host (e.g., host 110) may generate the one token by performing an XOR operation on the remaining tokens, the reference tag, and the application tag.

The first storage device (e.g., first storage device 150_1 or first storage device 160_1) may receive the data packets through a CXL switch. The CXL switch may include an address decoder. The address decoder may set a storage position in a memory of the first storage device (e.g., first storage device 150_1 or first storage device 160_1). Accordingly, the storage devices (e.g., first to n-th storage device 150_1 to 150_n or first to p-th storage device 160_1 to 160_p) may exchange the data packets with each other.

The first storage device (e.g., first storage device 150_1 or first storage device 160_1) may perform integrity verification based on the data packets (S1020). For example, the first storage device (e.g., first storage device 150_1 or first storage device 160_1) may receive first tokens corresponding to the other storage devices (e.g., second to n-th storage device 150_2 to 150_n or second to p-th storage device 160_2 to 160_p) from the host (e.g., host 110). The data packets may include second tokens. The second tokens may include a token from each of the other storage devices (e.g., second to n-th storage device 150_2 to 150_n or second to p-th storage device 160_2 to 160_p). The first storage device (e.g., first storage device 150_1 or first storage device 160_1) may perform the integrity verification by determining whether the first tokens and the second tokens match.

The first storage device (e.g., first storage device 150_1 or first storage device 160_1) may determine that the integrity verification is successful if the first tokens and the second tokens match, and may determine the integrity verification to fail if the first tokens and the second tokens do not match. If the integrity verification fails, the first storage device (e.g., first storage device 150_1 or first storage device 160_1) may re-request an error data packet corresponding to a token for which the integrity verification fails. For example, the first storage device (e.g., first storage device 150_1 or first storage device 160_1) may re-request to the host (e.g., host 110) or to the storage device corresponding to the error data packet.

If the integrity verification is successful, the first storage device (e.g., first storage device 150_1 or first storage device 160_1) may perform recovery using the data packets (S1030). The first storage device (e.g., first storage device 150_1 or first storage device 160_1) may generate a recovered data chunk by performing a logical operation on the data chunks of the data packets. In this case, one of the data chunks may be a parity data chunk. The host (e.g., host 110) may generate the parity data chunk by performing an XOR operation on data chunks other than the parity data chunk among the data chunks. The first storage device (e.g., first storage device 150_1 or first storage device 160_1) may generate the recovered data chunk by performing an XOR operation on the data chunks.

The first storage device (e.g., first storage device 150_1 or first storage device 160_1) may store the recovered data chunk in a non-volatile memory of the first storage device (e.g., first storage device 150_1 or first storage device 160_1). For example, the first storage device (e.g., first storage device 150_1 or first storage device 160_1) may obtain a first reference tag and a first application tag based on the data packets. The first storage device (e.g., first storage device 150_1 or first storage device 160_1) may obtain the first reference tag and the first application tag by performing an XOR operation on the tokens of the data packets. The first storage device (e.g., first storage device 150_1 or first storage device 160_1) may determine whether the first reference tag and the first application tag match a second reference tag and a second application tag stored in a non-volatile memory of the first storage device (e.g., first storage device 150_1 or first storage device 160_1). The first storage device (e.g., first storage device 150_1 or first storage device 160_1) may store the recovered data chunk in the non-volatile memory when the first reference tag and the first application tag match the second reference tag and the second application tag. The first storage device (e.g., first storage device 150_1 or first storage device 160_1) may perform an abnormality report to the host (e.g., host 110) when the first reference tag and the first application tag do not match the second reference tag and the second application tag.

Figure 11:
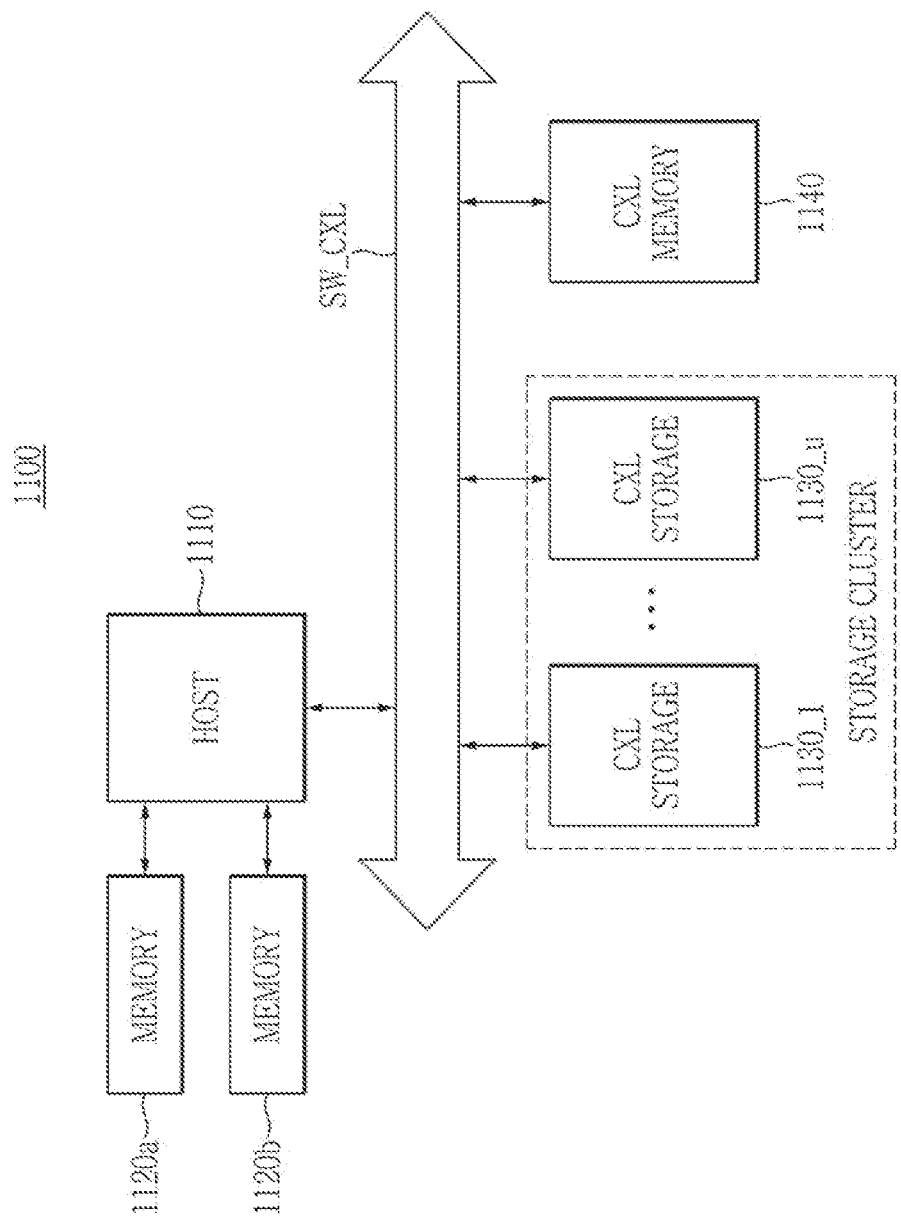
FIG. 11 is a block diagram of the computer system according to an example embodiment.

FIG. 11 is a block diagram of the computer system according to an example embodiment. Hereinafter, detailed descriptions of overlapping elements are omitted for convenience of description.

Referring to FIG. 11, the computer system 1100 may include a host 1110, a plurality of memories 1120a and 1120b, a CXL switch SW_CXL, a plurality of CXL storage devices 1130_1 to 1130_u (u is an integer greater than 1), and a CXL memory 1140. The host 1110, the plurality of memories 1120a and 1120b, and the CXL switch SW_CXL may correspond to the host 110, the memory 120, and the interface 140, respectively, of FIGS. 1 and 2.

The host 1110 may be directly connected to the plurality of memories 1120a and 1120b. The host 1110, the plurality of CXL storage devices 1130_1 to 1130_u, and the CXL memory 1140 may be connected to the CXL switch SW_CXL, and the host 1110, the plurality of CXL storage devices 1130_1 to 1130_u, and the CXL memory 1140 may communicate with each other through the CXL switch SW_CXL.

In an embodiment, each of the plurality of CXL storage devices 1130_1 to 1130_u may have a structure similar to that of the storage device described with reference to FIGS. 1 to 10. For example, the plurality of CXL storage devices 1130_1 to 1130_u may correspond to the plurality of storage devices 150_1 to 150_n of FIG. 1 or the plurality of storage devices 160_1 to 160_p of FIG. 2. The plurality of CXL storage devices 1130_1 to 1130_u may form a RAID set. When a data chunk of one (e.g., the first CXL storage device 1130_1) of the plurality of CXL storage devices 1130_1 to 1130_u has an error, the host 1110 may transmit a read command and first tokens to the remaining CXL storage devices (e.g., the second to u-th CXL storage devices 1130_2 to 1130_u). The second to u-th CXL storage devices 1130_2 to 1130_u may transmit data chunks to the first CXL storage device 1130_1 in response to the read command and the first tokens of the host 1110. When the second to u-th CXL storage devices 1130_2 to 1130_u transmit the data chunks to the first CXL storage device 1130_1, the host 1110 may transmit a recovery command and second tokens to the first CXL storage device 1130_1. The first CXL storage device 1130_1 may perform recovery in response to the recovery command. The first CXL storage device 1130_1 may compare the first tokens with the second tokens. When the first tokens and the second tokens match, the first CXL storage device 1130_1 may perform recovery based on the data chunks of the second to u-th CXL storage devices 1130_2 to 1130_u, and may store a recovered data chunk.

Each of the plurality of CXL storage devices 1130_1 to 1130_u may be implemented as an individual storage device or an individual storage module, and may be connected to the CXL switch SW_CXL through different physical ports. For example, since the plurality of CXL storage devices 1130_1 to 1130_u are connected to the CXL switch SW_CXL, a storage region usable by the host 1110 may be large in capacity.

In an embodiment, at least some regions of the CXL memory 1140 may be allocated as a dedicated region for the plurality of CXL storage devices 1130_1 to 1130_u. For example, the host 1110 may manage the plurality of CXL storage devices 1130_1 to 1130_u as one storage cluster, and may allocate some regions of the CXL memory 1140 as the dedicated region for the one storage cluster. Alternatively, the host 1110 may allocate some regions of the CXL memory 1140 as a dedicated region for each of the plurality of CXL storage devices 1130_1 to 1130_u.

Figure 12:
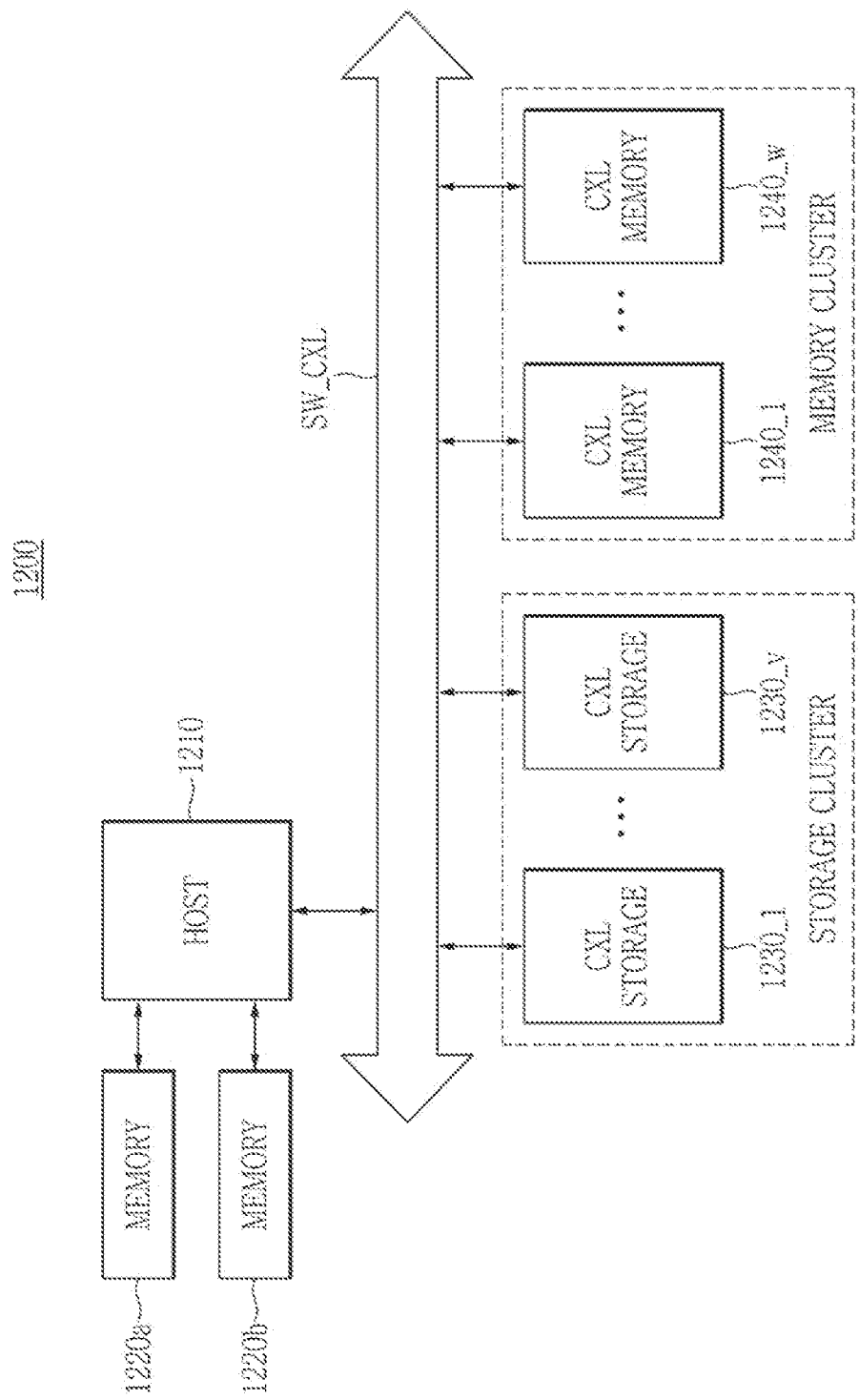
FIG. 12 is a block diagram of the computer system according to an example embodiment.

FIG. 12 is a block diagram of the computer system according to an embodiment. Hereinafter, for convenience of description, detailed descriptions of overlapping elements are not repeated.

Referring to FIG. 12, the computer system 1200 according to the embodiment may include a host 1210, a plurality of memories 1220a and 1220b, a CXL switch SW_CXL, a plurality of CXL storage devices 1230_1 to 1230_v (v is an integer greater than 1), and a plurality of CXL memories 1240_1 to 1240_w (w is an integer greater than 1). The host 1210, the plurality of memories 1220a and 1220b, and the CXL switch SW_CXL may correspond to the host 110, the memory 120, and the interface 140, respectively, of FIGS. 1 and 2.

The host 1210 may be directly connected to the plurality of memories 1220a and 1220b. The host 1210, the plurality of CXL storage devices 1230_1 to 1230_v, and the plurality of CXL memories 1240_1 to 1240_w may be connected to the CXL switch SW_CXL, and the host 1210, the plurality of CXL storage devices 1230_1 to 1230_v, and the plurality of CXL memories 1240_1 to 1240_w may communicate with each other through the CXL switch SW_CXL.

In an embodiment, the host 1210 may manage the plurality of CXL storage devices 1230_1 to 1230_v as one storage cluster, and may manage the plurality of CXL memories 1240_1 to 1240_w as one memory cluster. The host 1210 may allocate some regions of the memory cluster as a dedicated area (i.e., a region for storing map data of the storage cluster) for the one storage cluster. Alternatively, the host 1210 may allocate regions of the plurality of CXL memories 1240_1 to 1240_w as dedicated regions for the plurality of CXL storage devices 1230_1 to 1230_v.

In an embodiment, each of the plurality of CXL storage devices 1230_1 to 1230_v may have a structure similar to that of the storage devices described with reference to FIGS. 1 to 11. For example, the plurality of CXL storage devices 1230_1 to 1230_v may correspond to the plurality of storage devices 150_1 to 150_n of FIG. 1 or the plurality of storage devices 160_1 to 160_p of FIG. 2. The plurality of CXL storage devices 1230_1 to 1230_v may form a RAID set. When a data chunk of one (e.g., the first CXL storage device 1230_1) of the plurality of CXL storage devices 1230_1 to 1230_v has an error, the host 1210 may transmit a read command and first tokens to the remaining CXL storage devices (e.g., the second to v-th CXL storage devices 1230_2 to 1230_v). The second to v-th CXL storage devices 1230_2 to 1230_v may transmit data chunks to the first CXL storage device 1230_1 in response to the read command and the first tokens of the host 1210. When the second to v-th CXL storage devices 1230_2 to 1230_v transmit the data chunks to the first CXL storage device 1230_1, the host 1210 may transmit a recovery command and second tokens to the first CXL storage device 1230_1. The first CXL storage device 1230_1 may perform recovery in response to the recovery command. The first CXL storage device 1230_1 may compare the first tokens with the second tokens. When the first tokens and the second tokens match, the first CXL storage device 1230_1 may perform the recovery based on the data chunks of the second to v-th CXL storage devices 1230_2 to 1230_v, and may store a recovered data chunk.

Figure 13:
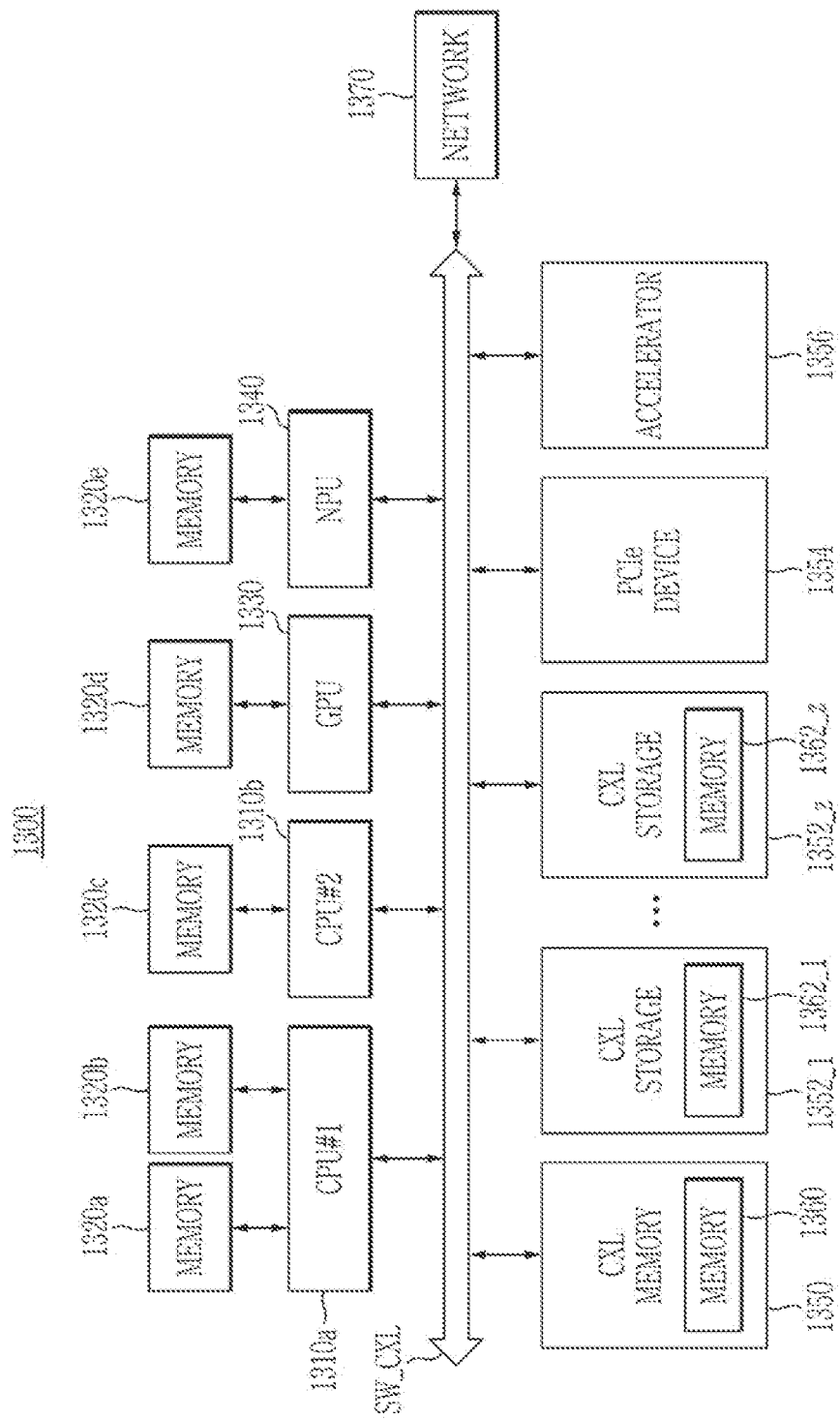
FIG. 13 is a block diagram of the computer system according to an example embodiment.

FIG. 13 is a block diagram of the computer system according to an example embodiment. For convenience of description, detailed descriptions of the components described above are not repeated.

Referring to FIG. 13, the computer system 1300 according to the embodiment includes a first CPU 1310a, a second CPU 1310b, a GPU 1330, an NPU 1340, a CXL switch SW_CXL, a CXL memory 1350, a plurality of CXL storage devices 1352_1 to 1352_z (z is an integer greater than 1), a PCIe device 1354, and an accelerator (a CXL device) 1356. Each of the first CPU 1310a, the second CPU 1310b, the GPU 1330, and the NPU 1340 may be directly connected to individual memories 1320a, 1320b, 1320c, 1320d, and 1320e. Each of the first CPU 1310a and the second CPU 1310b of FIG. 13 may correspond to host 110 of FIGS. 1 and 2, and the CXL switch SW_CXL of FIG. 13 may correspond to the interface 140 of FIGS. 1 and 2.

The first CPU 1310a, the second CPU 1310b, the GPU 1330, the NPU 1340, the CXL memory 1350, the plurality of CXL storage devices 1352_1 to 1352_z, the PCIe device 1354, and the accelerator (the CXL device) 1356 may be commonly connected to the CXL switch SW_CXL, and the first CPU 1310a, the second CPU 1310b, the GPU 1330, the NPU 1340, the CXL memory 1350, the plurality of CXL storage devices 1352_1 to 1352_z, the PCIe device 1354, and the accelerator (the CXL device) 1356 may communicate with each other through the CXL switch SW_CXL.

In an embodiment, the plurality of CXL storage devices 1352_1 to 1352_z may have a structure similar to that of the storage device described with reference to FIGS. 1 to 12. For example, the plurality of CXL storage devices 1352_1 to 1352_z may correspond to the plurality of storage devices 150_1 to 150_n of FIG. 1 or the plurality of storage devices 160_1 to 160_p of FIG. 2. The plurality of CXL storage devices 1352_1 to 1352_z may form a RAID set. When a data chunk of one CXL storage device (e.g., the first CXL storage device 1352_1) among the plurality of CXL storage devices 1352_1 to 1352_z has an error, the first CPU 1310a may transmit a read command and first tokens to the remaining CXL storage devices (e.g., the second to z-th CXL storage devices 1352_2 to 1352_z). The second to z-th CXL storage devices 1352_2 to 1352_z may transmit data chunks to the first CXL storage 1352_1 in response to the read command and the first tokens of the first CPU 1310a. When the second to z-th CXL storage devices 1352_2 to 1352_z transmit the data chunks to the first CXL storage device 1352_1, the first CPU 1310a may transmit a recovery command and second tokens to the first CXL storage device 1352_1. The first CXL storage device 1352_1 may perform recovery in response to the recovery command. The first CXL storage device 1352_1 may compare the first tokens with the second tokens. When the first tokens and the second tokens match, the first CXL storage device 1352_1 may perform the recovery based on the data chunks of the second to z-th CXL storage devices 1352_2 to 1352_z, and may store the recovered data chunk. Although FIG. 13 illustrates a configuration in which the first CPU 1310a communicates with the plurality of CXL storage devices 1352_1 to 1352_z, the embodiment is not necessarily limited thereto, and an embodiment may be implemented as a configuration in which at least one of the second CPU 1310b, the GPU 1330, and the NPU 1340 communicates with the plurality of CXL storage devices 1352_1 to 1352_z.

By any one or more of the first CPU 1310a, the second CPU 1310b, the GPU 1330, and the NPU 1340, at least some regions of memories 1362_1 to 1362_z of the plurality of CXL storage devices 1352_1 to 1352_z may be allocated as at least one cache buffer of the first CPU 1310a, the second CPU 1310b, the GPU 1330, the NPU 1340, the CXL memory 1350, the plurality of CXL storage devices 1352_1 to 1352_z, the PCIe device 1354, and the accelerator 1356.

In an embodiment, by any one or more of the first CPU 1310a, the second CPU 1310b, the GPU 1330, and the NPU 1340, at least some regions of a memory 1360 of the CXL memory 1350 may be allocated as at least one cache buffer of the first CPU 1310a, the second CPU 1310b, the GPU 1330, the NPU 1340, the CXL memory 1350, the plurality of CXL storage devices 1352_1 to 1352_z, the PCIe device 1354, and the accelerator 1356. That is, the CXL memory 1350 and the plurality of CXL storage devices 1352_1 to 1352_z may be used as a storage space of the computer system 1300.

In an embodiment, the CXL switch SW_CXL may be connected to the PCIe device 1354 or the accelerator 1356 configured to support various functions, and the PCIe device 1354 or the accelerator 1356 may communicate with each of the first CPU 1310a, the second CPU 1310b, the GPU 1330, and the NPU 1340 through the CXL switch SW_CXL or may access the storage space including the plurality of CXL storage devices 1352_1 to 1352_z and the CXL memory 1350.

In an embodiment, the CXL switch SW_CXL may be connected to an external network or fabric 1370, and may be configured to communicate with an external server through the external network or fabric.

FIG. 14 is a block diagram of a data center to which the computer system according to example embodiment is applied. For convenience of description, detailed descriptions of the components described above are not repeated.

Referring to FIG. 14, the data center 1400 may be a facility that stores various data and provides a service, and may also be referred to as a data storage center. The data center 1400 may be a system for operating a search engine and a database, and may be a computer system used by a company such as a bank or the like, or a government agency. The data center 1400 may include application servers 1410a, 1410b, . . . , 1410h and storage servers 1420a, 1420b, . . . , 1420h. The number of the application servers and the number of the storage servers may be variously selected according to an embodiment, and the number of the application servers and the number of the storage servers may be different from each other.

Hereinafter, a configuration of the first storage server 1420a will be mainly described. Each of the application servers 1410a, 1410b, . . . , 1410h and the storage servers 1420a, 1420b, . . . , 1420h may have a structure similar to each other, and the application servers 1410a, 1410b, . . . , 1410h and the storage server s 1420a, 1420b, . . . , 1420h may communicate with each other via a network NT.

The first storage server 1420a may include a processor 1421, a memory 1422, a switch 1423, a CXL memory 1424, a storage device 1425, and a network interface card (NIC) 1426. The processor 1421 may control an overall operation of the first storage server 1420a, and may access the memory 1422 to execute a command loaded in the memory 1422 or process data. The memory 1422 may include a double data rate synchronous DRAM (DDR SDRAM), a high bandwidth memory (HBM), a hybrid memory cube (HMC), a dual in-line memory module (DIMM), an optane DIMM, and/or a non-volatile memory DIMM (NVMDIMM). The processor 1421 and the memory 1422 may be directly connected, and the number of processors 1421 included in one storage server 1420a and the number of memories 1422 included in the one storage server 1420a may be variously selected.

In an embodiment, the processor 1421 and the memory 1422 may provide a processor-memory pair. In an embodiment, the number of processors 1421 and the number of memories 1422 may be different. The processor 1421 may include a single core processor or a multi-core processor.

The above description of the storage server 1420a may be similarly applied to each of the application servers 1410a, 1410b, . . . , 1410h.

The switch 1423 may be configured to mediate or route communication between various components included in the first storage server 1420a. In an embodiment, the switch 1423 may be the interface or the CXL switch described in FIGS. 1-13. The switch 1423 may be a switch implemented based on a CXL protocol.

The CXL memory 1424 may be connected to the switch 1423. In an embodiment, the CXL memory 1424 may be used as a memory expander for the processor 1421. Alternatively, the CXL memory 1424 may be allocated as a dedicated memory or a buffer memory for the storage device 1425 as described with reference to FIGS. 1 to 13.

The storage device 1425 may include a CXL interface circuit CXL_IF, a controller CTRL, and a NAND flash NAND. The storage device 1425 may store data or output stored data according to a request of the processor 1421.

In an embodiment, the storage device 1425 may be the storage device described with reference to FIGS. 1 to 13. For example, the storage device 1425 may correspond to the plurality of storage devices 150_1 to 150_n of FIG. 1 or the plurality of storage devices 160_1 to 160_p of FIG. 2. In an embodiment, similar to the description with reference to FIGS. 1 to 13, in the storage server 1420a, a plurality of storage devices 1425 may be implemented to form a RAID set, and when a data chunk of one storage device has an error, the one storage device may perform recovery based on data chunks of the remaining storage devices. The number of storage devices 1425 included in the storage server 1420a may be variously selected according to example embodiments.

The network interface card (NIC) 1426 may be connected to the switch 1423. The NIC 1426 may communicate with other storage servers 1420b, . . . , 1420h or other application servers 1410a, 1410b, . . . , 1410h through the network NT.

In an embodiment, the NIC 1426 may include a network interface card, a network adapter, or the like. The NIC 1426 may be connected to the network NT by a wired interface, a wireless interface, a Bluetooth interface, an optical interface, or the like. The NIC 1426 may include an internal memory, a digital signal processor (DSP), a host bus interface, and the like, and may be connected to the processor 1421, the switch 1423, and/or the like through the host bus interface. In an embodiment, the NIC 1426 may be integrated with at least one of the processor 1421, the switch 1423, and the storage device 1425.

In an embodiment, the network NT may be implemented using Fiber Channel (FC), Ethernet, or the like. In this case, the FC may be a medium used for relatively high-speed data transmission, and may use an optical switch providing high performance/high availability. The storage servers may be provided as a file storage, a block storage, or an object storage according to an access method of the network NT.

In an embodiment, the network NT may be a storage-only network such as a storage area network (SAN).

For example, the SAN may be an FC-SAN that uses an FC network and is implemented according to an FC Protocol (FCP). As another example, the SAN may be an IP-SAN that uses a TCP/IP network and is implemented according to an iSCSI (SCSI over TCP/IP or Internet SCSI) protocol. In an embodiment, the network NT may be a general network such as a TCP/IP network. For example, the network NT may be implemented according to a protocol such as FC over Ethernet (FCOE), Network Attached Storage (NAS), NVMe over Fabrics (NVMe-oF), or the like.

In an embodiment, at least one of the application servers 1410a, 1410b, . . . , 1410h may store data requested by a user or a client to be stored in one of the storage servers 1420a, 1420b, . . . , 1420h through the network NT. At least one of the application servers 1410a, 1410b, . . . , and 1410h may obtain data requested by the user or the client to read from one of the storage servers 1420a, 1420b, . . . , and 1420h through the network NT. For example, at least one of the application servers 1410a, 1410b, . . . , 1410h may be implemented as a web server, a database management system (DBMS), or the like.

In an embodiment, at least one of the application servers 1410a, 1410b, . . . , 1410h may access a memory, a CXL memory, or a storage device included in another application server through the network NT, or may access memories, CXL memories, or storage devices included in the storage servers 1420a, 1420b, . . . , 1420h through the network NT. Thus, at least one of the application servers 1410a, 1410b, . . . , 1410h may perform various operations on data stored in other application servers and/or the storage servers. For example, at least one of the application servers 1410a, 1410b, . . . , 1410h may execute a command for moving or copying data between the other application servers and/or the storage servers. In this case, the data may be moved from the storage devices of the storage servers through the memories or the CXL memories of the storage servers to the memory or the CXL memory of the application server, or may be directly moved to the memory or the CXL memory of the application server. The data moving through the network may be data encrypted for security or privacy.

In an embodiment, the CXL memory included in at least one of the application servers 1410a, 1410b, . . . , 1410h and the storage servers 1420a, 1420b, . . . , 1420h may be allocated as a dedicated region of the storage device included in at least one of the application servers 1410a, 1410b, . . . , 1410h and the storage servers 1420a, 1420b, . . . , 1420h, and the storage device may use the allocated dedicated region as a buffer memory (that is, the storage device may store map data). For example, the CXL memory included in another storage server (e.g., 1420h) may be allocated as the dedicated region of the storage device 1425 included in the storage server 1420a, and the storage device 1425 included in the storage server 1420a may access the CXL memory included in the other storage server (e.g., 1420h) through the switch 1423 and the NIC 1426. In this case, map data for the storage device 1425 of the first storage server 1420a may be stored in the CXL memory of the other storage server 1420h. That is, the storage devices and the CXL memories of the data center 1400 according to the present disclosure may be connected in various ways.

In an embodiment, each component or a combination of two or more components described with reference to FIG. 1 through FIG. 14 may be implemented as a digital circuit, a programmable or non-programmable logic device or array, an application specific integrated circuit (ASIC), or the like.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A storage device comprising:
a first memory configured to receive a plurality of data packets from a plurality of storage devices and store the plurality of data packets, the plurality of data packets including first tokens and data chunks corresponding to the plurality of storage devices;
a direct memory access (DMA) engine configured to perform integrity verification using the first tokens of the plurality of data packets and generate a recovered data chunk using the data chunks of the plurality of data packets received from the plurality of storage devices; and
a second memory that stores the recovered data chunk,
wherein each of the first tokens corresponds to one storage device of the plurality of storage devices, and
wherein the recovered data chunk corresponds to a data chunk having an error.

2. The storage device of claim 1, wherein each of the first tokens is generated using a random function.

3. The storage device of claim 1, wherein each of the first tokens is generated based on an identifier and a logical block address (LBA) of the one storage device of the plurality of storage devices.

4. The storage device of claim 1, wherein the first memory receives the plurality of data packets through a compute express link (CXL) switch.

5. The storage device of claim 1, wherein when the storage device receives a recovery command from a host, the DMA engine performs the integrity verification.

6. The storage device of claim 5, wherein the storage device receives second tokens corresponding to the plurality of storage devices together with the recovery command, the first memory stores the second tokens, and the DMA engine determines whether the first tokens and the second tokens match.

7. The storage device of claim 6, wherein the DMA engine determines that the integrity verification is successful if the first tokens and the second tokens match, and determines that the integrity verification fails if the first tokens and the second tokens do not match.

8. The storage device of claim 7, wherein when the integrity verification fails, the DMA engine re-requests an error data packet corresponding to a token for which the integrity verification fails.

9. The storage device of claim 8, wherein the DMA engine re-requests the error data packet by sending a request to the host or to a storage device of the plurality of storage devices corresponding to the error data packet.

10. The storage device of claim 1, wherein one of the data chunks is a parity data chunk, and the parity data chunk is generated by performing an exclusive OR (XOR) operation on other data chunks other than the parity data chunk among the data chunks and the data chunk of the storage device.

11. The storage device of claim 1, wherein the DMA engine generates the recovered data chunk by performing an XOR operation on the data chunks.

12. The storage device of claim 1, wherein the DMA engine obtains a first reference tag and a first application tag based on the plurality of data packets, determines whether the first reference tag and the first application tag match a second reference tag and a second application tag stored in the second memory, and stores the recovered data chunk in the second memory when the first reference tag and the first application tag match the second reference tag and the second application tag.

13. The storage device of claim 12, wherein the DMA engine obtains the first reference tag and the first application tag by performing an XOR operation on the first tokens of the plurality of data packets.

14. The storage device of claim 12, wherein one token of the first tokens is generated by performing an XOR operation on the remaining tokens of the first tokens, the first reference tag, and the first application tag.

15. A recovery method performed by a first storage device, comprising:
   receiving data packets from second storage devices that form a redundant array of inexpensive disks (RAID) set with the first storage device, each of the data packets including a data chunk and a first token corresponding to one of the second storage devices;
   performing integrity verification using the first token of each of the second storage devices; and
   performing recovery using the data packets chunk of each of the second storage devices when the integrity verification is successful,
   wherein the performing the recovery includes generating a recovered data chunk that corresponds to a data chunk having an error.

16. The recovery method of claim 15, further comprising:
   receiving the first tokens corresponding to the second storage devices from a host,
   wherein the data packets include second tokens, and the performing of the integrity verification includes determining whether the first tokens and the second tokens match.

17. The recovery method of claim 16, wherein the determining of whether the first tokens and the second tokens match comprises:
   determining that the integrity verification is successful when the first tokens and the second tokens match; and
   determining that the integrity verification fails when the first tokens and the second tokens do not match.

18. The recovery method of claim 17, further comprising re-requesting, when the integrity verification fails, an error data packet corresponding to a token for which the integrity verification fails.

19. The recovery method of claim 16, wherein one of the second tokens is generated based on the remaining tokens of the first tokens, a reference tag, and an application tag.

20. A computer system comprising:
   a plurality of storage devices that form a redundant array of inexpensive disks (RAID) set;
   a compute express link (CXL) switch that allows the plurality of storage devices to communicate with each other; and
   a host configured to transmit a read command and first tokens to second storage devices other than a first storage device among the plurality of storage devices through the CXL switch when an error is detected in the first storage device,
   wherein the second storage devices generate data packets based on the first tokens and transmit the data packets and the first tokens to the first storage device through the CXL switch in response to the read command,
   wherein the host transmits second tokens to the first storage device and transmits a recovery command that controls the first storage device to perform integrity verification by comparing the first tokens with the second tokens and perform recovery using data chunks of the second storage devices to generate a recovered data chunk if the integrity verification is successful, and
   wherein the recovered data chunk corresponds to a data chunk having an error.

* * * * *